US011696001B2

(12) United States Patent
Rothschild

(10) Patent No.: US 11,696,001 B2
(45) Date of Patent: Jul. 4, 2023

(54) ENHANCED IMMERSIVE DIGITAL MEDIA

(71) Applicant: Cox Communications, Inc., Atlanta, GA (US)

(72) Inventor: Keith Alan Rothschild, Atlanta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 16/915,690

(22) Filed: Jun. 29, 2020

(65) Prior Publication Data

US 2020/0413157 A1 Dec. 31, 2020

Related U.S. Application Data

(60) Provisional application No. 62/868,659, filed on Jun. 28, 2019.

(51) Int. Cl.
*H04N 21/845* (2011.01)
*H04N 21/44* (2011.01)
*H04N 21/2343* (2011.01)
*H04N 21/234* (2011.01)
*H04N 21/43* (2011.01)

(52) U.S. Cl.
CPC ... *H04N 21/8456* (2013.01); *H04N 21/23424* (2013.01); *H04N 21/23439* (2013.01); *H04N 21/4307* (2013.01); *H04N 21/44016* (2013.01)

(58) Field of Classification Search
CPC ......... H04N 21/8456; H04N 21/23424; H04N 21/23439; H04N 21/4307; H04N 21/44016; H04N 21/21805; H04N 21/234; H04N 21/816
See application file for complete search history.

(56) References Cited

U.S. PATENT DOCUMENTS

| 9,576,394 | B1 * | 2/2017 | Kozko | G06T 17/00 |
|---|---|---|---|---|
| 2014/0347262 | A1 * | 11/2014 | Paek | G06F 3/147 |
| | | | | 345/156 |
| 2018/0124371 | A1 * | 5/2018 | Kamal | H04N 13/271 |
| 2019/0318488 | A1 * | 10/2019 | Lim | H04N 21/816 |
| 2020/0043214 | A1 * | 2/2020 | Velevski | G06T 15/08 |
| 2020/0066034 | A1 * | 2/2020 | Tham | G06T 7/73 |
| 2020/0143838 | A1 * | 5/2020 | Peleg | G11B 27/34 |
| 2020/0184653 | A1 * | 6/2020 | Faulkner | G06T 7/40 |

* cited by examiner

*Primary Examiner* — Adil Ocak
(74) *Attorney, Agent, or Firm* — Eversheds Sutherland (US) LLP

(57) ABSTRACT

This disclosure describes systems, methods, and devices related to immersive digital media. A method may include receiving, at a first device, first volumetric data, and second volumetric data including a first volumetric time slice of a first volumetric media stream. The method may include determining that the first volumetric time slice includes a first portion and a second portion, the first portion representing a first object and including an amount of the second volumetric data. The method may include determining that the first volumetric data represents the first object. The method may include generating a second volumetric time slice including the first volumetric data and the second portion of the first volumetric time slice, and generating a second volumetric media stream including the second volumetric time slice. The method may include sending the second volumetric media for presentation at a third device.

20 Claims, 12 Drawing Sheets

ENHANCED IMMERSIVE DIGITAL MEDIA

CROSS-REFERENCE TO RELATED APPLICATIONS

This application claims the benefit of U.S. Provisional Application No. 62/868,659, filed Jun. 28, 2019, the disclosure of which is incorporated by reference as if set forth in full.

TECHNICAL FIELD

This disclosure generally relates to devices, systems, and methods for immersive digital media.

BACKGROUND

Digital media technology increasingly is being used to create immersive user experiences. Building ecosystems for respective user environments may be difficult. For example, streaming volumetric data representing a user's environment may be very resource-intensive, and may result in a negative user experience. There is therefore a need for enhanced devices, systems, and methods for immersive digital media.

Figure 1:
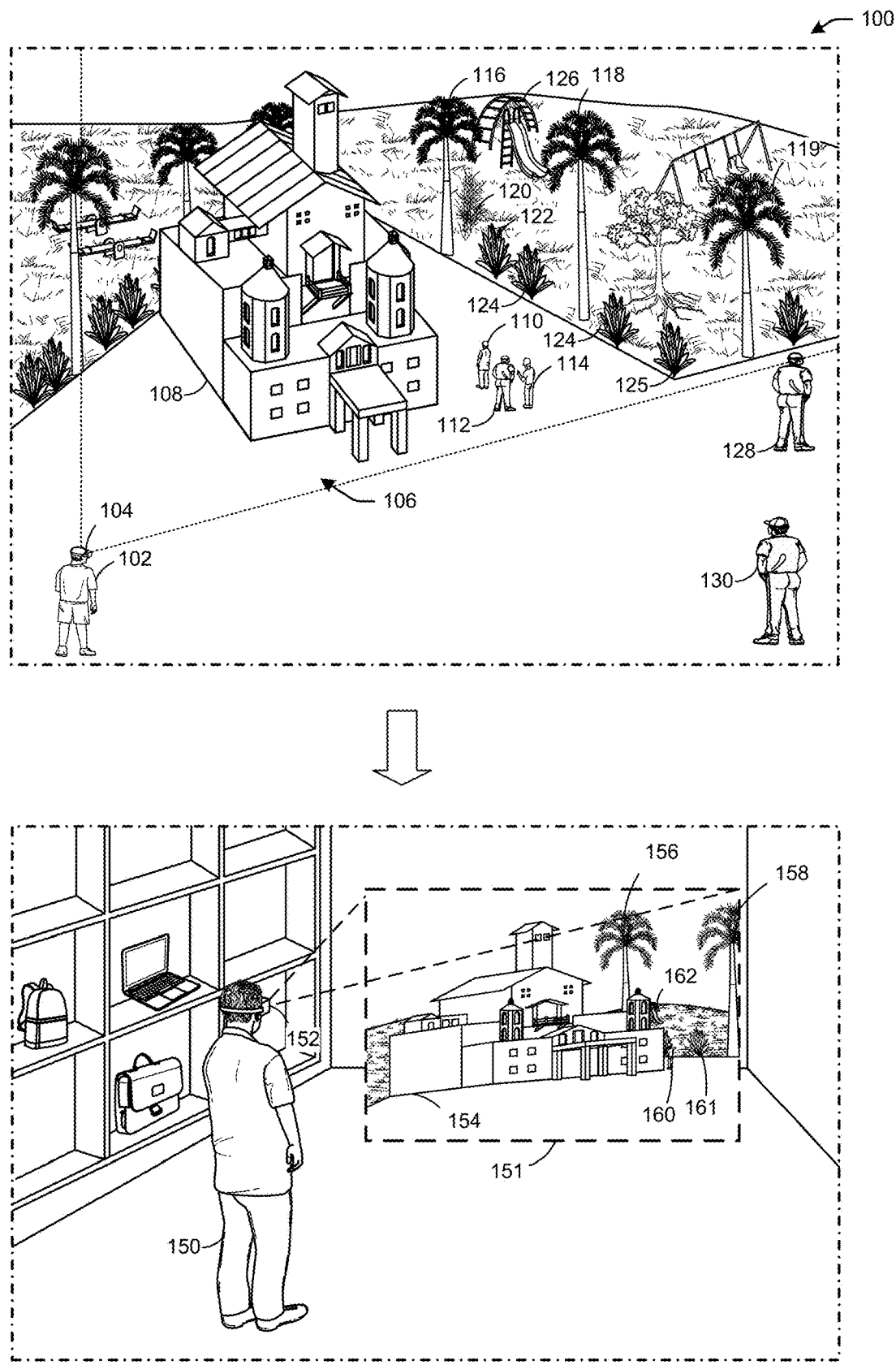
FIG. 1 illustrates an example system for immersive digital media, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for immersive digital media. The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

People increasingly are experiencing environments and ecosystems from remote locations. For example, rather than being physically present at an event, people may connect virtually in ways that allow one person to see the current environment (e.g., room, location, etc.) of another person. When a person is moving, and therefore the surrounding environment is changing (e.g., different objects and people may appear as the person moves, and/or the person's field of view may change as the person moves, etc.), capturing the person's surroundings in real-time for display on a device in a remote location may require significant computer resources, network resources, device resources, and the like. For example, to live-stream an event from one location to a device at another location may require significant bandwidth and processing resources, even with compression of video and audio data. In particular, visual (e.g., volumetric) and audio data of one person's surroundings may be captured by a device, encoded, transmitted over a network to another device, decoded by the other device, and rendered in near real-time to allow another person to share the experience. However, such transmission and presentation of data may experience latency issues that may prevent the presentation from being at or near real-time, thereby undermining user experience (e.g., a remote user and an in-environment user may wish to discuss the environment as it appears), and may require significant bandwidth even with significant data compression.

Light field technology is an example technology that may be used to generate immersive digital media. Devices may capture a volume of light rays flowing in different directions, wavelengths, frequencies, and times. The surface properties of the light rays may be used to determine what to do with those light rays to create an immersive digital media experience for a user. For example, cameras (e.g., using time of flight calculations), light detection and ranging (LIDAR) sensors, structured light scanners, camera arrays, and artificial intelligence may be used to capture live images (e.g., gameplay, user actions, live video, etc.). Data of light rays, such as RBG light, volumetric light, and light field data may be captured. Light fields represent the ways that people view and perceive light, and can be difficult to represent in a virtual reality setting.

Devices and applications may capture and recreate light fields in different directions and volumes. By capturing images over a given volume, devices and applications may reproduce light rays wherever a user may look within the given volume. In this manner, a device may recreate a three-dimensional environment for a user based on the user's vantage point, height, angle, location, etc. For example, as a person turns his or her head in while viewing immersive digital media, motion parallax and other visual cues simulating reality may be maintained to create a realistic viewing experience.

Virtual and augmented reality use volumetric data to represent people and/or objects at a given time (e.g., a volumetric time slice) in a three-dimensional manner. For example, volumetric video techniques (e.g., using light field technology) may allow for the capturing of three-dimensional image data. In particular, light field technology may facilitate the detection of light at a given location from all directions in a three-dimensional space. Using the detected light at any location may allow for the creation of a scene (e.g., based on a given pixel's distance from the device that captures the light data for the pixel).

Creating an ecosystem for an environment using enhanced immersive digital media may be difficult and resource-intensive. For example, stereoscopy may create the illusion of depth in an image. Therefore, virtual and augmented reality may provide a representation of how users actually view their surroundings. However, virtual reality environments may have latency issues related to processing and rendering content. Therefore, creating a three-dimensional model adaptive for environments and displays in two dimensions may provide challenges in rendering display data.

In one or more embodiments, to avoid having to encode, transmit, and decode all information needed to describe the entire environment (e.g., all volumetric visual and/or audio data detected by a device at the environment), a system may leverage predefined and distributed assets to reduce the amount of data to transmit between devices, and to reduce the amount of data to encode and decode. For example, given a particular environment, such as a theme park, the system may have access to content assets such as images of particular attractions (e.g., buildings, rides, etc.) at known geographic locations. The system may have access to volumetric data (e.g., representing respective volumetric time slices that present images of people, costumed characters, and the like, which also may be predefined and distributed content assets). In this manner, based on location information of a device and/or image recognition of objects and/or people in an environment, the system may determine whether any known objects or people are within a person's surrounding environment (e.g., field of view of the person and/or a device used by the person), and may reconstruct volumetric visual and audio data based on a combination of detected volumetric visual and audio data supplemented by the predefined assets. For example, when the system determines that a device of a person in an environment is near a particular structure, such as a known building, rather than encoding and transmitting all of the volumetric visual data capturing the structure, the system may identify a predefined asset representing a volumetric time slice of the structure and stitch (or otherwise insert) the predefined asset into other volumetric visual data of the environment. Similarly, the system may insert predefined volumetric visual data representing images of people and/or objects (e.g., specific people identified by image analysis or user input, generic images of people represented by predefined assets, generic predefined assets showing the sky, the ground, trees, location features, etc.). In this manner, rather than reconstructing an entire volumetric time slice as a snapshot of a person's environment at a given time, the system may combine a portion of the volumetric visual and/or audio data associated with a volumetric time slice with predefined assets (e.g., that have already been processed), reducing the amount of data to transmit, encode, and decode.

In one or more embodiments, the system may evaluate device data, such as the device's location (e.g., using global navigation satellite system data, wireless beacons or other signals, or other location data), user inputs (e.g., voice utterances mentioning a location, person, and/or object), image analysis (e.g., object and/or person recognition techniques to identify people and/or objects represented by volumetric visual data), gestures corresponding to people and/or objects, a time at which volumetric visual and/or audio data is captured, detected media presented at an environment, and the like. For example, volumetric visual and/or audio data may indicate that a particular song is being played or that a particular performance is occurring at the captured environment, and the system may determine that the song or performance indicates that a predefined asset may be used to recreate the environment, such as by identifying that fireworks are to be displayed at a given time when a particular song is playing. In this manner, the system may use a predefined asset (e.g., presenting fireworks in video and audio data in a volumetric media stream of the environment) based on a determination that a fireworks display occurs at a particular time, and/or based on an identification of audio indicating that the fireworks are being displayed at the environment.

In one or more embodiments, the system may determine the network resources to use to encoded, transmit, and decode volumetric visual and/or audio data based on whether any predefined assets are available to represent the current environment being captured for a volumetric media stream. For example, predefined assets representing objects and/or persons of interest may be encoded at a higher resolution than some assets, such as background objects, unknown persons at the environment, and the like, whether the less interesting people or objects (e.g., background objects, unknown people, etc.) may be replaced with predefined assets or not. When the system determines that a predefined asset may be used in place of the volumetric visual and/or audio data representing the actual objects and/or people detected at the environment (e.g., by one or more devices at the environment), the system may extract the volumetric visual and/or audio data from the captured volumetric visual or audio data, stitch the volumetric data of a predefined asset into the captured volumetric data, select a compression method based on the stitched volumetric data, and transmit the encoded volumetric data over a network to one or more devices that may present a representation of the environment captured by the volumetric data. In this manner, the representation of the environment captured by the volumetric data may not be the exact same as the video and/or audio at the environment, but may be an accurate representation of the environment, particularly for objects and/or people of interest.

For example, it may be of less interest to the remote viewer to see the exact tree in the background of the environment or the exact cloud in the sky of the environment, so predefined assets may allow for the insertion of representations of objects such as trees or clouds, or people who may be bystanders (e.g., in contrast with known persons of interest, such as friends or family members, whose faces and/or voices may be known and identifiable to the system to avoid replacing the persons of interest with unknown persons represented by predefined assets; alternatively, persons of interest may be represented by predefined assets that may be used to represent the persons of interest in any given volumetric time slice of a volumetric media stream). Alternatively, video data capturing items that are not of interest (e.g., items not represented by predefined assets or represented by predefined assets tagged as lower priority than other predefined assets representing people and/or objects of interest). In this manner, people and objects of interest may be represented by the actual volumetric visual and/or audio data of the environment that is captured by a device, and/or by predefined assets that provide an actual representation of an image or sound (e.g., an actual picture of a particular roller coaster or building), and the encoding of volumetric media streams generated using volumetric time slices including combined captured media and predefined assets may include encoding people and/or objects of interest at higher resolutions than people and/or objects not of interest to a viewer (e.g., as explicitly indicated by a viewer or automatically determined based on user preferences, image analysis, asset tags, and the like).

In one or more embodiments, the system may use telemetry to create the most accurate representation of a remote viewer's experience of a remote environment. For example, when an adult is at home watching a live stream of an environment experienced by a smaller child, the height difference of the adult and child may affect the way that the volumetric visual data is presented to the adult. For example, the system may be provided user inputs, such as the height of users, images of users, voice recordings of users, etc., that the system may use to identify particular users. When the adult is two feet taller than the child, for example, the field of view of the adult would be two feet higher from the ground than the field of view of the child if the adult actually were with the child at the environment. Similarly, the adult may be next to the child with a different field of view than the child if the adult actually were with the child at the environment. In this manner, the system may adjust the captured video of the environment by using predefined assets showing a different view of an asset than one represented by the captured volumetric visual data to provide a realistic view of the environment from the adult's hypothetical vantage point. The system may identify expressions of the child at the environment, and may represent those in the video presented to the adult based on the adult's hypothetical vantage point.

In one or more embodiments, the system may use a single content source, and a single content rendering device enabling the content to be consumed in a synchronized manner such that it is temporally relevant to the user experience (e.g., also referred to as a content sync device). To play the correct content from a content source (e.g., actual captured content of an environment) to create an enhanced immersive digital media experience for a remote viewer (e.g., the adult and child example above), the system may use a cache as a proxy device (e.g., proximal to a device displaying the immersive digital media to the remote viewer). The proxy may reduce latency, a source of dizziness for the remote viewer. For example, the content delivery and rendering decisions may be time-sensitive. The processing time and overall system latency may be reduced by the use and placement of the proxy. In particular, the use of a cache as a proxy device (e.g., between the device capturing the environment and the device presenting a representation of the environment to a remote viewer) may avoid a need to send all captured audio and video from the capturing device to the remote rendering device. The proxy may store predefined assets that the system may use to replace captured volumetric visual data. In this manner, the full captured volumetric visual and/or audio data may not need to be transmitted the entire way across a network from the device capturing the environment to the device presenting a representation of the environment to a remote viewer, but instead a smaller amount of volumetric visual and/or audio data (e.g., based on the encoding of the combined data) may be used for at least a portion of the transmission(s) between the device capturing the environment and the device presenting a representation of the environment to a remote viewer. Likewise, the system may not need to process all of the captured volumetric data, and the amount of data processing for volumetric media streams may be reduced by leveraging predefined assets that have been generated and processed by the system prior to receiving live volumetric media stream data.

In one or more embodiments, a content sync may be a device that receives and consumes content for display to an end user, and may provide feedback (e.g., telemetry data) to the system indicating the viewer of content (e.g., height, distance, orientation, etc.).

In one or more embodiments, a content source may be a server that stores content at rest (e.g., predefined content assets).

In one or more embodiments, a content rendering service may collect content sources and information about content syncs, and may create a version of the content to be rendered by a particular content sync. The content rendering service may determine whether captured video and/or audio data at an environment may be replaced with one or more predefined content assets. The content rendering service may determine, using any of the techniques described herein, whether the amount of volumetric visual and/or audio data to be transmitted across one or more networks to a content rendering device may be reduced by relying on predefined content assets. Rather than encoding all of the captured volumetric visual and/or audio data, for example, the content rendering service may rely on previously encoded content assets whose volumetric visual data may substitute for at least some of the captured volumetric visual and/or audio to create volumetric time slices that are smaller in terms of data size than the captured (and possibly encoded) volumetric data of the environment. Based on the information received from the content sources (e.g., predefined content assets), the data provided by the content syncs, and captured volumetric visual and/or audio data from one or more devices at the environment, the content rendering service may generate volumetric time slices in one or more volumetric media streams to be transmitted across one or more networks to one or more content rendering devices.

In one or more embodiments, multiple content sources may be used in combination with one or multiple content syncs. For example, multiple people may be watching the same content at the same time, and user interaction while watching the content may be possible. In this manner, a system may need to render a representation of one or more users while rendering the content that the users are each watching.

In one or more embodiments, a content sync may provide information about users. For example, the content sync may indicate a user's height, distance from the sync, orientation in a room, etc. The content sync may provide user information to a rendering point, which may compile such information from multiple content syncs and content sources. A rendering point may use the aggregated data from content syncs to create a volumetric model for rendering content. A single rendering point may not need to make such decisions, as a content consumption hub may offload such activity.

In one or more embodiments, a proxy cache, rendering point, and content hub may be cloud components (e.g., remote network components accessible to multiple user devices). The placement of such cloud components may be dynamic to create efficiencies (e.g., latency reduction). Cloud components may have primary and backup components. For example, a primary cache may store content for rendering, and a backup cache also may store the same content, allowing for a device to access the content from multiple caches. Multiple rendering points may act in parallel.

In one or more embodiments, enhanced immersive digital media may be used in a variety of interactive experiences. For example, a person may be walking through a theme park or other location wearing an augmented reality (AR) device to convey the surrounding area and environment to a remote user wearing a virtual reality (VR) device to simulate the user's experience. In such a scenario with both AR and VR devices, latency may occur on both ends, so edge placement of cloud components (e.g., within a small threshold distance of the devices) may reduce latency. Other immersive experiences may include multiplayer games, movies, multimedia, and other digital content which may combine users or represent one user's experience to one or multiple other users.

In one or more embodiments, a media-aware network used for immersive digital media may be aware of an application (e.g., a single-player game, multi-player game, passive viewing experience, interactive experience, etc.). The media-aware network may identify available network resources such as storage, graphical processing units (GPUs), rendering points, and the like, allowing any application request initiated by an end user to be processed according to quality of service (QoS) agreements between a network service provider and end user.

In one or more embodiments, immersive digital media may adapt content for a variety of displays and audio systems by using a smart network that may match the type of application/interactivity and device requirements of a user's request to a service level purchased by the end user and to a rendering experience supported by enhanced immersive digital media systems. For example, an environment or universe for immersive digital media may include a global coordinate system for a set of scenarios, global shared layers (e.g., biomes, civilization, weather, shapes/mesh with rigidity or deformation characteristics, transparency and translucency properties, texture properties, and rules for how a user moves within a universe with respect to direction, paths, and time. Individual layers and shared layers may be used to create an environment. Sound may require multiple sources. A distributed set of files may describe a universe and may be combined over a content delivery network (CDN) or similar network to facilitate distributed rendering and processing of content.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an example system 100 for immersive digital media, in accordance with one or more example embodiments of the present disclosure.

Referring to FIG. 1, the system 100 may include a user 102 wearing a headset 104 or other device (e.g., an augmented reality headset). The user 102 may be at a theme park, and through the headset 104, may see the theme park with a field of view 106 (e.g., point of view at a given time) that represents objects and people in front of the user 102. For example, within the user's field of view captured (e.g., detected) by the headset 104 may be a structure 108 (e.g., a building), one or more nearby people (e.g., person 110, person 112, person 114), and one or more objects (e.g., tree 116, tree 118, tree 119, bush 120, bush 122, bush 124, bush 125, playground 126). Other people and/or objects may be outside of the field of view 106 (e.g., person 128, person 130).

Still referring to FIG. 1, a person 150 (e.g., a family member or friend of the user 102) who is not physically present with the user 102 at the theme park may be able to experience the theme park with the user 102 (e.g., by using virtual reality with a headset 152). For example, the field of view 106 of the headset 104 may generate a volumetric media stream with volumetric time slices whose volumetric data may represent the people and/or objects in the field of view 106 and their respective distances from the headset 104. The volumetric media stream may be presented to the person 150 (e.g., by streaming the volumetric media stream across one or more networks, as explained further herein, to the headset 152). In this manner, a volumetric time slice 151 presented to the person 150 using the headset 152 may include three-dimensional representations of the people and/ or objects in the field of view 106. For example, the volumetric time slice 151 may be one of multiple volumetric time slice in a volumetric media stream representing the field of view 106 over time (which may change based on the location and/or orientation of the user 102). The volumetric time slice 151 may include a volumetric visual representation 154 of the structure 108, a volumetric visual representation 156 of the tree 118, a volumetric visual representation 158 of the tree 119, a volumetric representation 160 of the person 114, a volumetric visual representation 161 of the bush 125, and a volumetric visual representation 162 of the playground 126. The people and/or objects represented by the volumetric visual data of the volumetric time slice 151 may be digital representations of the people and/or objects detected by the headset 104 based on the field of view 106, and/or may include substituted digital representations of the people and/or objects detected by the headset 104 based on the field of view 106. For example, the substituted digital representations of the people and/or objects captured by the headset 104 may include pre-generated and pre-stored (e.g., before generation of the volumetric visual data captured by the headset 104) volumetric data of content assets whose volumetric visual data (e.g., pixel light and/or depth data) may replace the corresponding volumetric visual data representing the people and/or objects detected by the headset 104.

In one or more embodiments, to avoid having to encode, transmit, and decode volumetric visual and/or audio data for an entire three-dimensional scene of an environment at a given time slice, the system 100 may leverage predefined and distributed assets to reduce the amount of data to transmit between devices (e.g., between the headset 104 and the headset 152), and to reduce the amount of data to encode and decode. For example, given a particular environment, such as a theme park, the system 100 may have access to content assets such as volumetric visual data representing the structure 108, trees, specific people (e.g., persons of interest) or general people (e.g., unspecified persons who happen to be in the field of view 106), and the like. In this manner, based on location information of the headset 104 and/or image recognition of objects and/or people in an environment, the system 100 may determine whether any known objects or people are within the field of view 106, and may reconstruct volumetric visual and/or audio data based on a combination of detected volumetric data supplemented by the volumetric data of predefined assets. For example, when the system 100 determines that the headset 104 is near the structure 108, rather than encoding and transmitting all of the volumetric visual data representing the structure 108, the system 100 may identify the volumetric visual representation 154 of the structure 108. Similarly, the system 100 may combine the volumetric visual representation 154 of the structure 108 (e.g., as volumetric visual data) with other volumetric visual data detected by the headset 104 to generate the volumetric time slice 151.

In one or more embodiments, the system 100 may evaluate device data, such as the location of the headset 104 (e.g., using global navigation satellite system data, wireless beacons or other signals, or other location data), user inputs (e.g., voice utterances mentioning a location, person, and/or object), image analysis (e.g., object and/or person recognition techniques to identify people and/or objects represented by volumetric visual data), gestures corresponding to people and/or objects, a time at which volumetric visual and/or audio data is detected, detected media presented at an environment, and the like. For example, audio data may indicate that a particular song is being played or that a particular performance is occurring at the captured environment, and the system 100 may determine that the song or performance indicates that a predefined asset may be used to recreate the environment, such as by identifying that fireworks are to be displayed at a given time when a particular song is playing. In this manner, the system may use a predefined asset (e.g., presenting fireworks in volumetric visual and/or audio data in a volumetric media stream of the environment) based on a determination that a fireworks display occurs at a particular time, and/or based on an identification of audio indicating that the fireworks are being displayed at the environment.

In one or more embodiments, the system 100 may determine the network resources to use to encoded, transmit, and decode volumetric visual and/or audio data based on whether any predefined assets are available to represent the current environment being captured for a volumetric media stream. For example, predefined assets representing objects and/or persons of interest (e.g., the structure 108) may be encoded at a higher resolution than some assets, such as background objects, unknown persons at the environment, and the like, whether the less interesting people or objects may be replaced with predefined assets (e.g., the representations of the people and/or objects) or not. When the system 100 determines that a predefined asset may be used in place of the volumetric visual and/or audio data representing the actual volumetric data detected at the environment (e.g., by one or more devices at the environment), the system 100 may extract the volumetric visual and/or audio data from the detected volumetric visual and/or audio data, stitch the volumetric data of a predefined asset into the detected volumetric visual and/or audio data, select a compression method based on the stitched volumetric data, and transmit the encoded volumetric visual and/or audio data over a network to the headset 152. In this manner, the representation of the environment detected by the headset 104 may not be the exact same as the volumetric data presented using the headset 152, but may be an accurate representation of the environment, particularly for objects and/or people of interest.

Devices such as the headsets may include a hardware processor (e.g., a central processing unit (CPU), a graphics processing unit (GPU), a hardware processor core, or any combination thereof), a main memory and a static memory, some or all of which may communicate with each other via an interlink or network. Devices may further include a power management device, a graphics display device, an alphanumeric input device (e.g., a keyboard), and a user interface (UI) navigation device (e.g., a mouse). In an example, the graphics display device, alphanumeric input device, and UI navigation device may be a touch screen display. Devices may additionally include a storage device (i.e., drive unit), a signal generation device (e.g., a speaker), and a network interface device/transceiver coupled to antenna(s). Devices may include an output controller, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

Devices may include a machine readable medium on which is stored one or more sets of data structures or instructions (e.g., software) embodying or utilized by any one or more of the techniques or functions described herein. The instructions may also reside, completely or at least partially, within a main memory, within a static memory, or within the hardware processor during execution thereof. In an example, one or any combination of the hardware processor, the main memory, the static memory, or the storage device may constitute machine-readable media.

Figure 2A:
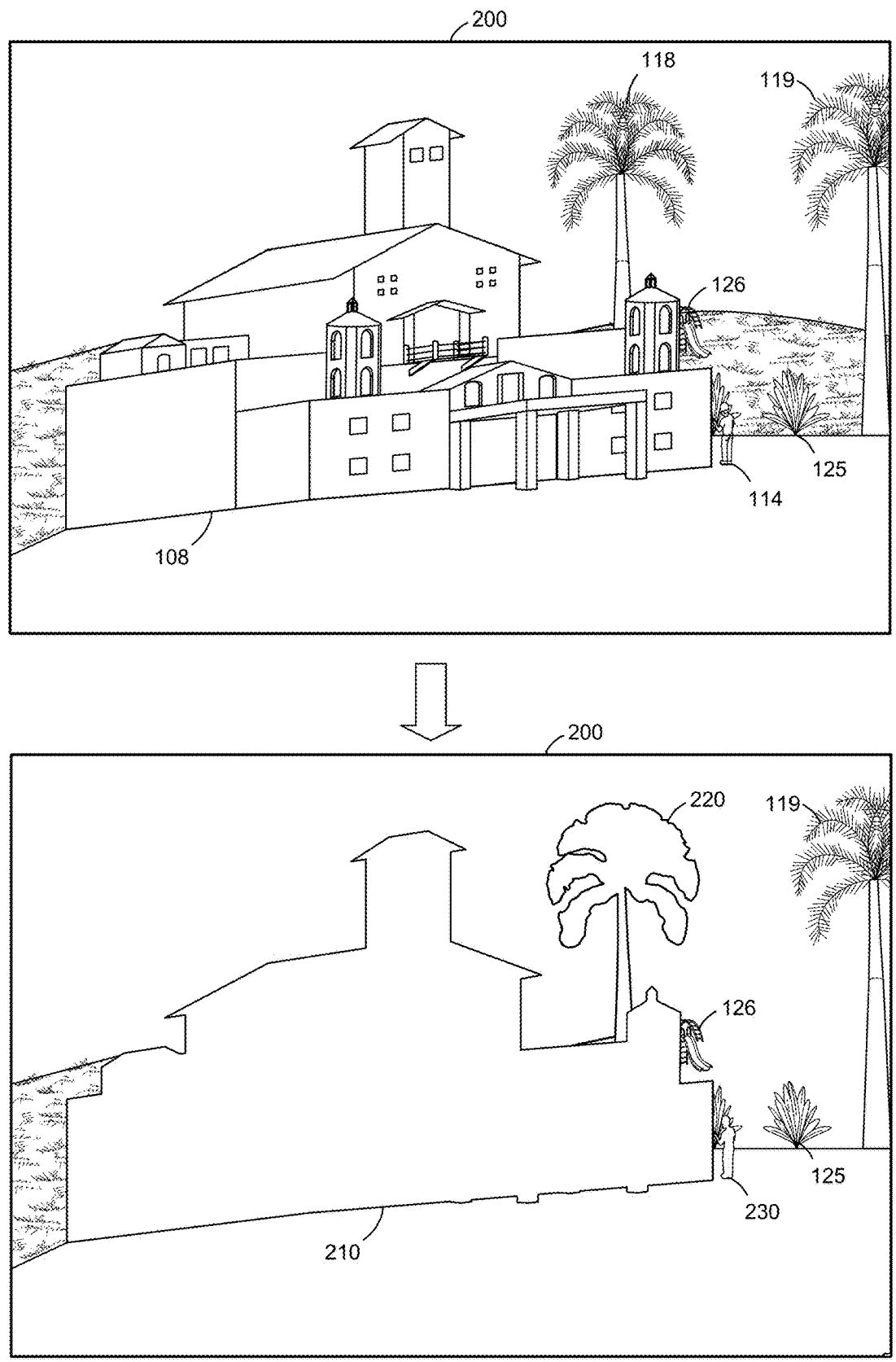
FIG. 2A illustrates an example use of a volumetric time slice for immersive digital media, in accordance with one or more example embodiments of the present disclosure.

FIG. 2A illustrates an example use of a volumetric time slice 200 for immersive digital media, in accordance with one or more example embodiments of the present disclosure.

Referring to FIG. 2A, the volumetric time slice 200 may be the scene represented by the field of view 106 of the headset 104 of FIG. 1 at a given time. In particular, when the user 102 of FIG. 1, using the headset 104, looks in the direction of the structure 108 of FIG. 1, the headset 104 may detect volumetric visual and/or audio data to represent individual volumetric time slices of a volumetric media feed (e.g., to be presented using the headset 152 of FIG. 1). The volumetric time slice 200 may include volumetric visual data representing the structure 108, the person 114, the tree 118, the tree 119, the bush 125, and the playground 126 of FIG. 1.

Figure 2B:
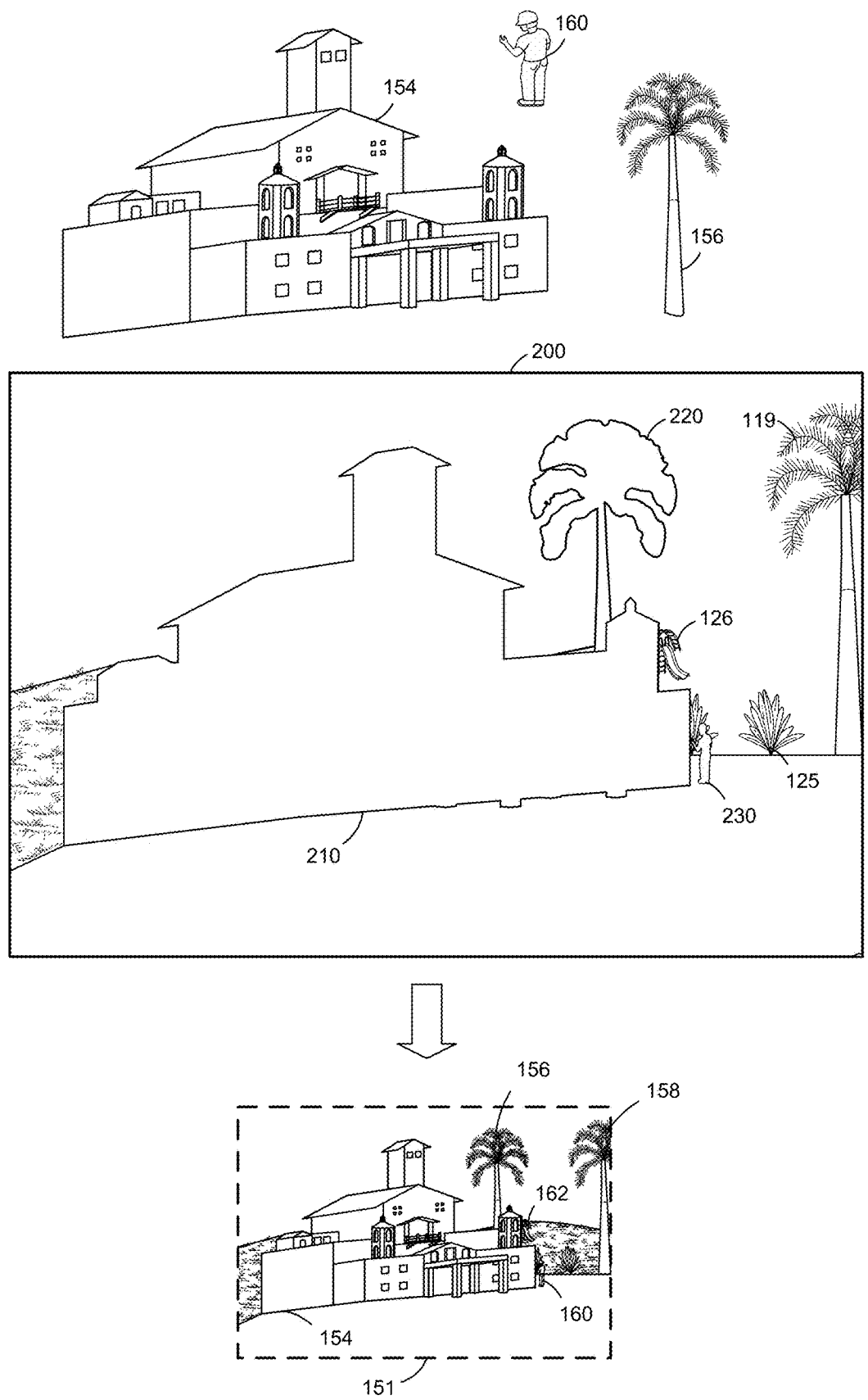
FIG. 2B illustrates a modification to the example volumetric time slice of FIG. 2A used for immersive digital media, in accordance with one or more example embodiments of the present disclosure.
Figure 3:
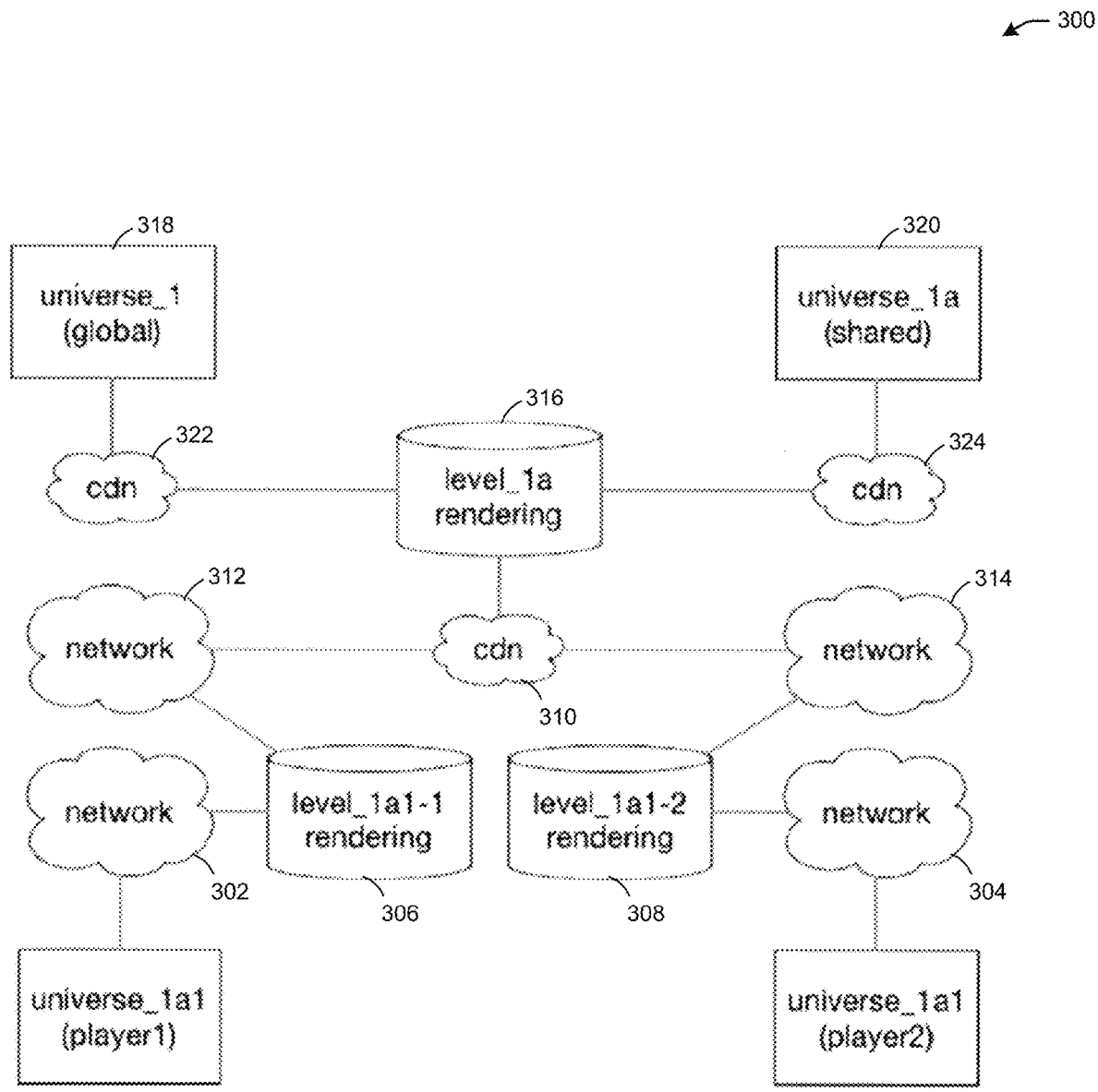
FIG. 3 illustrates an example system for immersive digital media, in accordance with one or more example embodiments of the present disclosure.

Still referring to FIG. 2A, a content rendering service (e.g., as shown in FIG. 3) may receive the volumetric time slice 200 and may identify objects and/or people represented by the volumetric visual data of the volumetric time slice 200. Based on the identified objects and/or people, the content rendering service may determine whether any predefined content assets that represent the identified objects and/or people are available for use in a volumetric time slice. For example, the content rendering service may determine that a predefined volumetric visual representation of the structure 108 is available, that a predefined volumetric visual representation of the tree 118 is available, and that a predefined volumetric visual representation of the person 114 is available. The predefined volumetric representations (e.g., volumetric time slices) may be encoded at a different resolution than the volumetric time slice 200 based on the type of object and/or people represented by the predefined volumetric visual representations. For example, an object of interest, such as the structure 108, may be encoded at a higher resolution than a portion 210 of the volumetric time slice 200 representing the structure 108. In this manner, the portion 210 of the volumetric time slice 200 representing the structure 108 may be replaced with a predefined volumetric visual representations of the structure 108 as shown in FIG. 2B. The person 114 may not be a person of interest (e.g., a preselected person in a group with the user 102), and instead may be a bystander. In this manner, the person 114 and the tree 118 (e.g., as an identified background object) may be encoded at a lower or higher resolution than a portion 220 of the volumetric time slice 200 representing the tree 118 and a portion 230 of the volumetric time slice 200 representing the person 114, respectively, depending on whether the content rendering service is programmed to enhance a particular background object or unknown person.

FIG. 2B illustrates a modification to the example volumetric time slice 200 of FIG. 2A used for immersive digital media, in accordance with one or more example embodiments of the present disclosure.

Referring to FIG. 2B, the volumetric time slice 200 is shown with removed portions 210, 220 and 230, and with the tree 119, the bush 125, and the playground 126 of FIG. 1. The identified predefined volumetric time slices for the structure 108, the person 114, and the tree 118 in FIG. 2A may include a predefined volumetric time slice (e.g., volumetric data of the volumetric visual representation 154) representing the structure 108, a predefined volumetric time slice (e.g., volumetric visual data of the volumetric visual representation 156) representing the tree 118 (e.g., a generic tree or a specifically identified tree in the field of view 106 of FIG. 1), and a predefined volumetric time slice (e.g., volumetric visual data of the volumetric visual representation 160) of the person 114 (e.g., a known person or an unknown passerby). Using the predefined volumetric time slices, the content rendering service (e.g., as shown in FIG. 3) may stitch or otherwise combine volumetric data of the volumetric time slice 200 with the predefined volumetric time slices. For example, the portion 210 of the volumetric time slice 200 may be replaced with the predefined volumetric visual representation 154. The portion 220 of the volumetric time slice 200 may be replaced with the predefined volumetric visual representation 156. The portion 230 of the volumetric time slice 200 may be replaced by the predefined volumetric time slice 160. Stitching together the volumetric visual data of the volumetric time slice that are not replaced by predefined volumetric time slices, the content rendering service may generate the volumetric time slice 151 of FIG. 1 (e.g., using a combination of volumetric data detected by the headset 104 at a first time and the predefined volumetric visual data generated before the first time). The encoding method used to generate the volumetric time slice 151 may be selected based on whether any predefined volumetric time slices are used, how much of the volumetric time slice 151 uses predefined volumetric visual data, whether the predefined volumetric time slices used represent people and/or objects of interest, and the like. In this manner, the volumetric time slice 151 may not represent the exact field of view 106 of FIG. 1, but a replica of the field of view 106 that simulates the field of view 106 to the person 150 of FIG. 1. The use of the predefined images may improve volumetric media quality and may avoid latency issues with streaming volumetric time slices between devices over one or more networks.

In one or more embodiments, the content rendering service may use telemetry to create the most accurate representation of a remote viewer's experience of a remote environment. For example, when the person 150 is at home watching a live stream of an environment experienced by the user 102, the height difference between the person 150 and the user 102 may affect the way that the volumetric time slice 151 is presented to the person 150. For example, the content rendering service may be provided user inputs, such as the height of users, images of users, voice recordings of users, etc., that the system may use to identify particular users. When the person 150 is two feet taller than the user 102, for example, the field of view of the person 150 would be two feet higher from the ground than the field of view 106 if the person 150 actually were with the user 102 at the environment. In this manner, the content rendering service may adjust the detected volumetric visual data of the environment by using predefined assets showing a different view of an asset than one represented by the detected volumetric visual data to provide a realistic view of the environment from the person's hypothetical vantage point.

The volumetric time slice 151 that may include a combination of volumetric visual data detected by the headset 104 and the volumetric visual representation 154, the volumetric visual representation 156, and/or the volumetric visual representation 160 may be considered different from a video frame generated based on a reference frame. For example, some video coding standards allow for the coding and decoding of video frames based on one or more reference frames on which a decoder may base portions of video data in order to reduce processing resources. However, such reference frames are based on the video data from a same video file or feed. By introducing the volumetric visual representation 154, the volumetric visual representation 156, and/or the volumetric visual representation 160 to the volumetric time slice 200, the resulting volumetric time slice 151 may be generated in a different manner because the volumetric data of the volumetric time slice 200 is not used to generate the volumetric visual data of the volumetric visual representation 154, the volumetric visual representation 156, and/or the volumetric visual representation 160. Instead, the volumetric visual representation 154, the volumetric visual representation 156, and/or the volumetric visual representation 160 may be generated at a different time from volumetric visual data, and the volumetric visual representation 154, the volumetric visual representation 156, and/or the volumetric visual representation 160 may be considered separate computer-executable files (e.g., separate volumetric time slices) whose volumetric data may be used in volumetric time slices of multiple volumetric media feeds.

In one or more embodiments, the data detected by the headset 104 of FIG. 1 may include audio data. To simulate the environment (e.g., the theme park example of FIG. 1), the detected audio data may be substituted with pre-generated audio. For example, when the detected audio includes voice utterances of the user 102 (e.g., based on voice detection, volume of the audio indicative of the proximity of the user 102 to the headset 104, etc.), the voice utterances may be included with the volumetric time slice 151 so that the person 150 may hear what the user 102 is saying. However, audio representing general background noise detected by the headset 104 may be filtered out or substituted with pre-generated audio. Likewise, audio of interest, such as a detected song, performance, speech, or the like may be substituted with pre-generated audio. For example, a performance may be pre-recorded, and when the performance is detected by the headset 104 (e.g., based on audio, video, time, location, etc.), the pre-recorded performance may be included with the volumetric time slice 151.

FIG. 3 illustrates a system 300, in accordance with one or more example embodiments of the present disclosure.

Referring to FIG. 3, multiple users (e.g., player 1, player 2, who may refer to the user 102 and the person 150 of FIG. 1, respectively) may connect to one or more communication networks (e.g., network 302, network 304). The users may experience a respective universe based on where the user is looking or moving (e.g., the field of view 106 of FIG. 1). Each user's universe may correspond to a rendering point (e.g., level_1a1-1 rendering 306, level_1a1-2 rendering 308). A content delivery network (CDN) 310 may collect content (e.g., volumetric visual data captured by the headset 104 and/or the headset 152 of FIG. 1), device data, user data, and other data from the respective rendering points (e.g., which may be provided by the users' display devices) over one or more communication networks (e.g., network 312, network 314), and may use a rendering point (e.g., level-1a rendering 316) to generate respectively rendered universes. For example, universe_1 (global) 318 may include be global content that can be copied and used by one or multiple users. Universe 1a (shared) 320 may include a single copy that can be used by one user at a time. The level-1a rendering 316 may be a content rendering service that receives content from CDN 322 and from CDN 324.

In one or more embodiments, the system 300 may evaluate device data, such as the device's location (e.g., using global navigation satellite system data, wireless beacons or other signals, or other location data), user inputs (e.g., voice utterances mentioning a location, person, and/or object), image analysis (e.g., object and/or person recognition techniques to identify people and/or objects represented by volumetric visual data), gestures corresponding to people and/or objects, a time at which volumetric visual and/or audio data is captured, detected media presented at an environment, and the like. For example, detected volumetric visual and/or audio data may indicate that a particular song is being played or that a particular performance is occurring at the captured environment, and the system 300 may determine that the song or performance indicates that a predefined asset may be used to recreate the environment, such as by identifying that fireworks are to be displayed at a given time when a particular song is playing. In this manner, the system 300 may use a predefined asset (e.g., presenting fireworks in volumetric visual and/or audio data in a volumetric media stream of the environment) based on a determination that a fireworks display occurs at a particular time, and/or based on an identification of visual and/or audio data indicating that the fireworks are being displayed at the physical environment.

In one or more embodiments, the system 300 may determine the network resources to use to encoded, transmit, and decode media data based on whether any predefined assets are available to represent the current physical environment being captured for a volumetric media stream (e.g., as referred to in FIG. 2A and FIG. 2B). For example, predefined assets representing objects and/or persons of interest may be encoded at a higher resolution than some assets, such as background objects, unknown persons at the environment, and the like, whether the less interesting people or objects may be replaced with predefined assets or not. When the system 300 determines that a predefined asset may be used in place of the volumetric visual and/or audio data representing the actual visual and/or audio data captured at the physical environment (e.g., by one or more devices at the environment), the system 300 may extract the data from the captured volumetric visual and/or audio data, stitch the volumetric visual and/or audio data of a predefined asset into the detected volumetric visual and/or audio data, select a compression method based on the stitched volumetric visual and/or audio data, and transmit the encoded volumetric visual and/or audio data over a network to one or more devices (e.g., the users) that may present a representation of the physical environment represented by the volumetric visual and/or audio data. In this manner, the representation of the physical environment represented by the volumetric visual and/or audio data may not be the exact same as the volumetric visual and/or audio data present at the physical environment, but may be an accurate representation of the physical environment, particularly for objects and/or people of interest.

For example, it may be of less interest to the remote viewer to see the exact tree in the background of the physical environment or the exact cloud in the sky of the physical environment, so predefined assets may allow for the insertion of volumetric visual representations of objects such as trees or clouds, or people who may be bystanders (e.g., in contrast with known persons of interest, such as friends or family members, whose faces and/or voices may be known and identifiable to the system 300 to avoid replacing the persons of interest with unknown persons represented by predefined assets; alternatively, persons of interest may be represented by predefined assets that may be used to represent the persons of interest in any given volumetric time slice). Alternatively, volumetric visual data representing items that are not of interest (e.g., items not represented by predefined assets or represented by predefined assets tagged as lower priority than other predefined assets representing people and/or objects of interest). In this manner, people and objects of interest may be represented by the actual visual and/or audio data of the environment that is detected by a device, and/or by predefined assets that provide an actual representation of volumetric visual and/or audio data, and the encoding of volumetric media streams generated using volumetric time slices including combined captured media and predefined assets may include encoding people and/or objects of interest at higher resolutions than people and/or objects not of interest to a viewer (e.g., as explicitly indicated by a viewer or automatically determined based on user preferences, image analysis, asset tags, and the like).

In one or more embodiments, the system 300 may use telemetry to create the most accurate virtual representation of a remote viewer's experience of a remote physical environment. For example, when an adult is at home watching a live stream of a physical environment experienced by a smaller child, the height difference of the adult and child may affect the way that the volumetric visual data of the virtual representation is presented to the adult. For example, the system 300 may be provided user inputs, such as the height of users, images of users, voice recordings of users, etc., that the system may use to identify particular users. In this manner, the system 300 may adjust the captured visual data of the environment by using predefined assets showing a different view of an asset than one represented by the captured visual data to provide a realistic view of the environment from the adult's hypothetical vantage point. The system 300 may identify expressions of the child at the environment, and may represent those in the video presented to the adult based on the adult's hypothetical vantage point.

In one or more embodiments, the system 300 may use a content source (e.g., the CDNs) and content sync device (e e.g., level_1a1-1 rendering 306, level_1a1-2 rendering 308) for consuming content. To play the correct content from a content source (e.g., actual captured content of an environment) to create an enhanced immersive digital media experience for a remote viewer, the system 300 may use the sync as a proxy device (e.g., proximal to a device displaying the immersive digital media to the remote viewer). The proxy may reduce latency, a source of dizziness for the remote viewer. The proxy device may store predefined assets that the system 300 may use to replace captured video and/or audio data. In this manner, the full captured visual data may not need to be transmitted the entire way across a network from the device capturing the environment to the device presenting a virtual representation of the physical environment to a remote viewer, but instead a smaller amount of visual data (e.g., based on the encoding of the combined data) may be used for at least a portion of the transmission(s) between the device capturing the environment and the device presenting a virtual representation of the physical environment to a remote viewer. Likewise, the system 300 may not need to process all of the captured visual data, and the amount of data processing for volumetric media streams may be reduced by leveraging predefined assets that have been generated and processed by the system prior to receiving live media stream data.

In one or more embodiments, a content rendering service (e.g., level_1a rendering 316) may collect content sources and information about content syncs, and may create a version of the content to be rendered by a particular content sync. The content rendering service may determine whether captured volumetric visual and/or audio data at a physical environment may be replaced with one or more predefined content assets to generate one or more volumetric time slices. The content rendering service may determine, using any of the techniques described herein, whether the amount of volumetric visual and/or audio data to be transmitted across one or more networks to a content rendering device may be reduced by relying on predefined content assets. Rather than encoding all of the detected volumetric visual and/or audio data, for example, the content rendering service may rely on previously encoded content assets whose volumetric visual and/or audio data may substitute for at least some of the detected volumetric visual and/or audio data to create volumetric time slices that are smaller in terms of data size than the captured (and possibly encoded) volumetric visual and/or audio data of the physical environment. Based on the information received from the content sources (e.g., predefined content assets), the data provided by the content syncs, and detected volumetric visual and/or audio data from one or more devices at the physical environment, the content rendering service may generate volumetric time slices in one or more volumetric media streams to be transmitted across one or more networks to one or more content rendering devices.

In one or more embodiments, multiple content sources may be used in combination with one or multiple content syncs. For example, multiple people may be watching the same content at the same time, and user interaction while watching the content may be possible. In this manner, the system 300 may need to render a representation of one or more users while rendering the content that the users are each watching.

In one or more embodiments, a content sync may provide information about users. For example, the content sync may indicate a user's height, distance from the sync, orientation in a room, etc. The content sync may provide user information to a rendering point, which may compile such information from multiple content syncs and content sources. A rendering point may use the aggregated data from content syncs to create a volumetric model for rendering content. A single rendering point may not need to make such decisions, as a content consumption hub may offload such activity.

In one or more embodiments, a proxy cache, rendering point, and content hub may be cloud components (e.g., remote network components accessible to multiple user devices). The placement of such cloud components may be dynamic to create efficiencies (e.g., latency reduction). Cloud components may have primary and backup components. For example, a primary cache may store content for rendering, and a backup cache also may store the same content, allowing for a device to access the content from multiple caches. Multiple rendering points may act in parallel.

In one or more embodiments, enhanced immersive digital media may be used in a variety of interactive experiences. For example, a person may be walking through a theme park or other location wearing an AR device to convey the surrounding area and environment to a remote user wearing a virtual reality VR device to simulate the user's experience. In such a scenario with both AR and VR devices, latency may occur on both ends, so edge placement of cloud components (e.g., within a small threshold distance of the devices) may reduce latency. Other immersive experiences may include multiplayer games, movies, multimedia, and other digital content which may combine users or represent one user's experience to one or multiple other users.

In one or more embodiments, a media-aware network used for immersive digital media may be aware of an application (e.g., a single-player game, multi-player game, passive viewing experience, interactive experience, etc.). The media-aware network may identify available network resources such as storage, graphical processing units (GPUs), rendering points, and the like, allowing any application request initiated by an end user to be processed according to quality of service (QoS) agreements between a network service provider and end user.

In one or more embodiments, immersive digital media may adapt content for a variety of displays and audio systems by using a smart network that may match the type of application/interactivity and device requirements of a user's request to a service level purchased by the end user and to a rendering experience supported by enhanced immersive digital media systems. For example, an environment or universe for immersive digital media may include a global coordinate system for a set of scenarios, global shared layers (e.g., biomes, civilization, weather, shapes/mesh with rigidity or deformation characteristics, transparency and translucency properties, texture properties, and rules for how a user moves within a universe with respect to direction, paths, and time. Individual layers and shared layers may be used to create an environment. Sound may require multiple sources. A distributed set of files may describe a universe and may be combined over a CDN or similar network to facilitate distributed rendering and processing of content.

The networks may use any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver may include one or more physical jacks (e.g., Ethernet, coaxial, or phone jacks) or one or more antennas to connect to a communications network. In an example, the network interface device/transceiver may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution and includes digital or analog communications signals or other intangible media to facilitate communication of such software.

Figure 4:
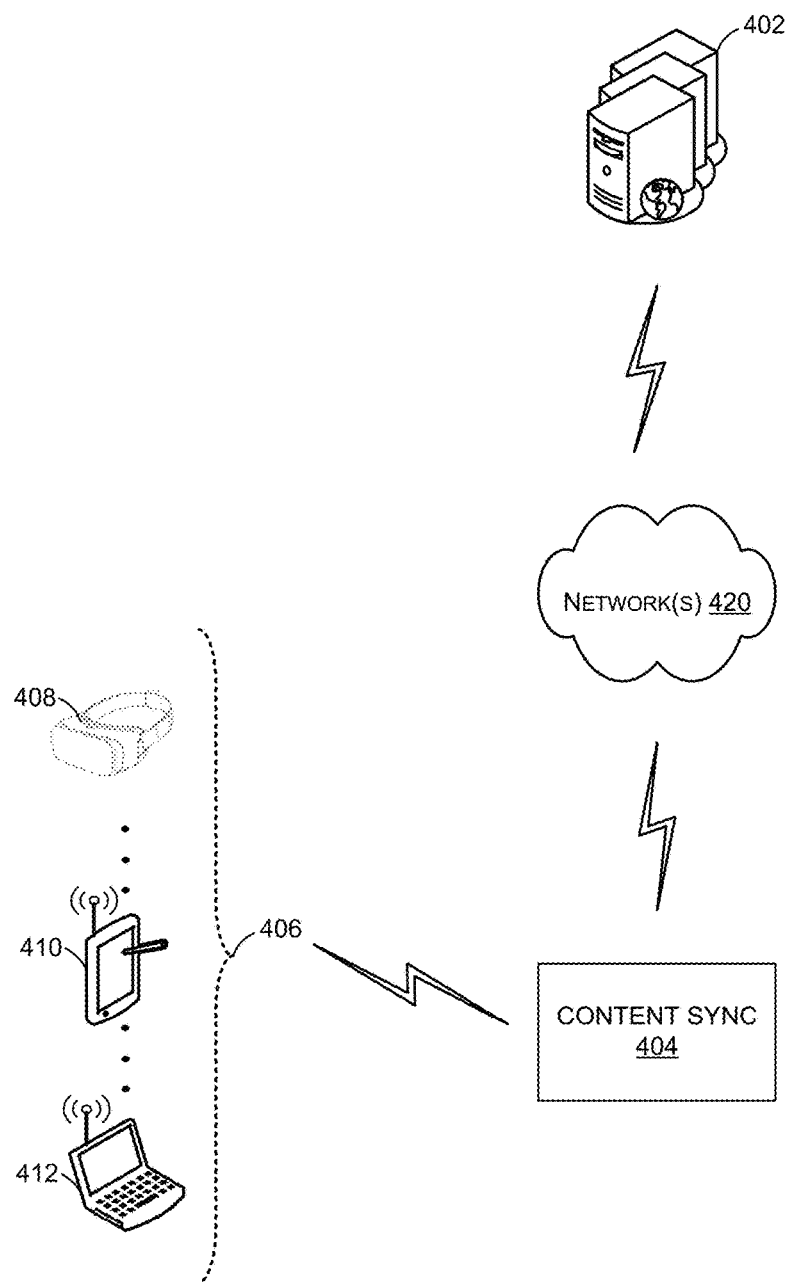
FIG. 4 illustrates an example system for immersive digital media, in accordance with one or more example embodiments of the present disclosure.

FIG. 4 illustrates an example system 400 for immersive digital media, in accordance with one or more example embodiments of the present disclosure.

Referring to FIG. 4, the system 400 may remove the need for adaptation. The system 400 may include one or more content sources 402 (e.g., servers or other devices storing content), a content sync device 404 (e.g., a device which receives and consumes content for display at one or more user devices 406), and one or more content displays (e.g., the one or more user devices 406, including user device 408, user device 410, and user device 412, similar to the headset 104 and/or the headset 152 of FIG. 1). The one or more content sources may communicate with the content sync 404 over one or more communications networks 420. The one or more user devices 406 may communicate with the content sync 404 using wired or wireless connections. The content sync 404 may serve as a proxy device in that it may be more proximal to the device displaying content than to the device providing the content to be displayed.

In one or more embodiments, the one or more communications networks 420 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the one or more communications networks 420 may have any suitable communication range associated therewith and may include, for example, global networks (e.g., the Internet), metropolitan area networks (MANs), wide area networks (WANs), local area networks (LANs), or personal area networks (PANs). In addition, any of the one or more communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 5:
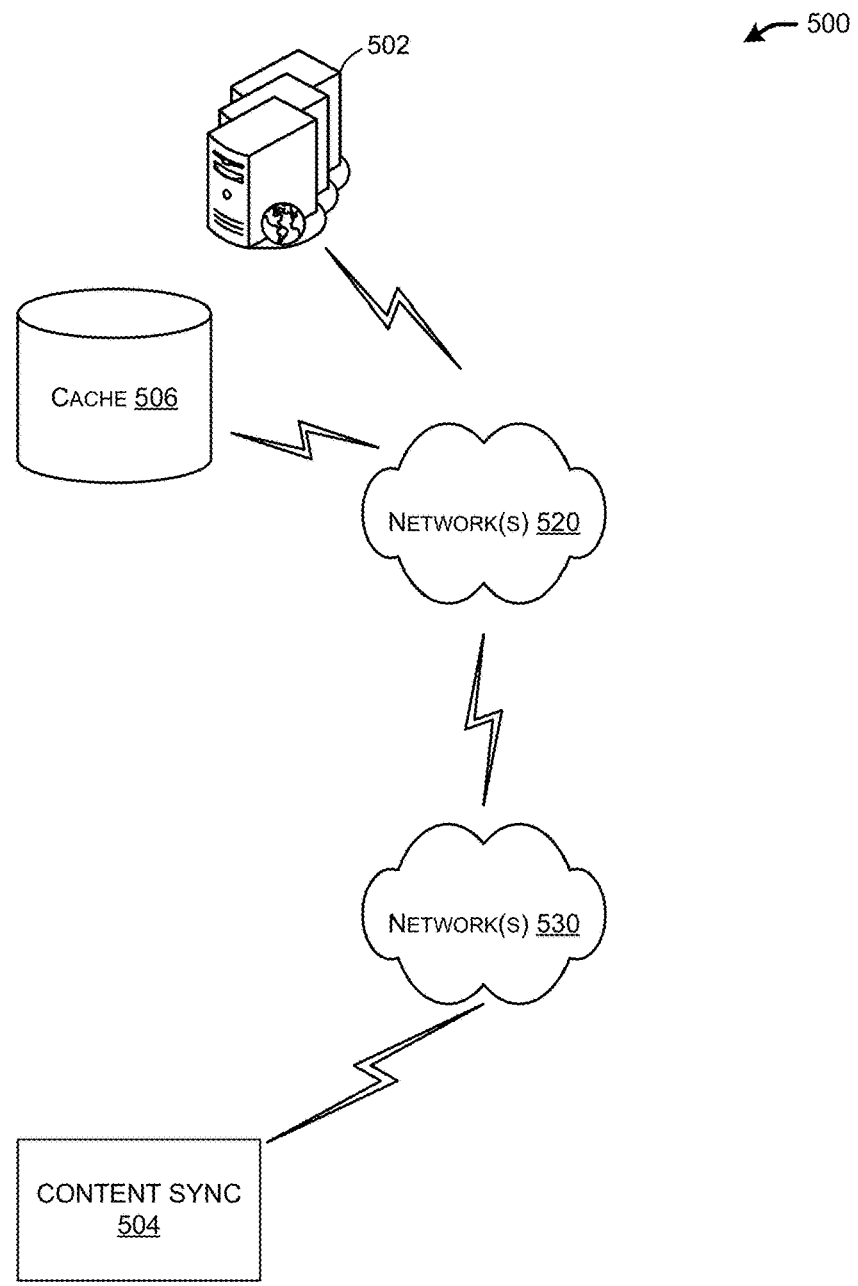
FIG. 5 illustrates an example system for immersive digital media, in accordance with one or more example embodiments of the present disclosure.

FIG. 5 illustrates an example system 500 for immersive digital media, in accordance with one or more example embodiments of the present disclosure.

Referring to FIG. 5, the system 500 may not require adaptation, but network distance may impair user experience. For example, the longer the network distance, the more latency a user (e.g., the person 150 of FIG. 1) may experience when viewing content. The system 500 may include one or more content servers 502 (e.g., content sources) delivering content to a content sync 504 over communications networks 520 and communications networks 530 (e.g., sharing properties with the one or more communications networks 420 of FIG. 4). Because of the multiple communications networks and/or distance between the one or more content servers 502 and the content sync 504, the system may use a proxy cache 506 to store content closer to the content sync 504 than the one or more content servers 502, allowing content to be delivered more quickly to the content sync 504, reducing latency. In this manner, the cache 506 may serve as a proxy to the content sync 504 to reduce the load on the communications networks 520 and/or communications networks 530, and to reduce latency when providing content (e.g., the volumetric time slice 151 of FIG. 1).

Figure 6:
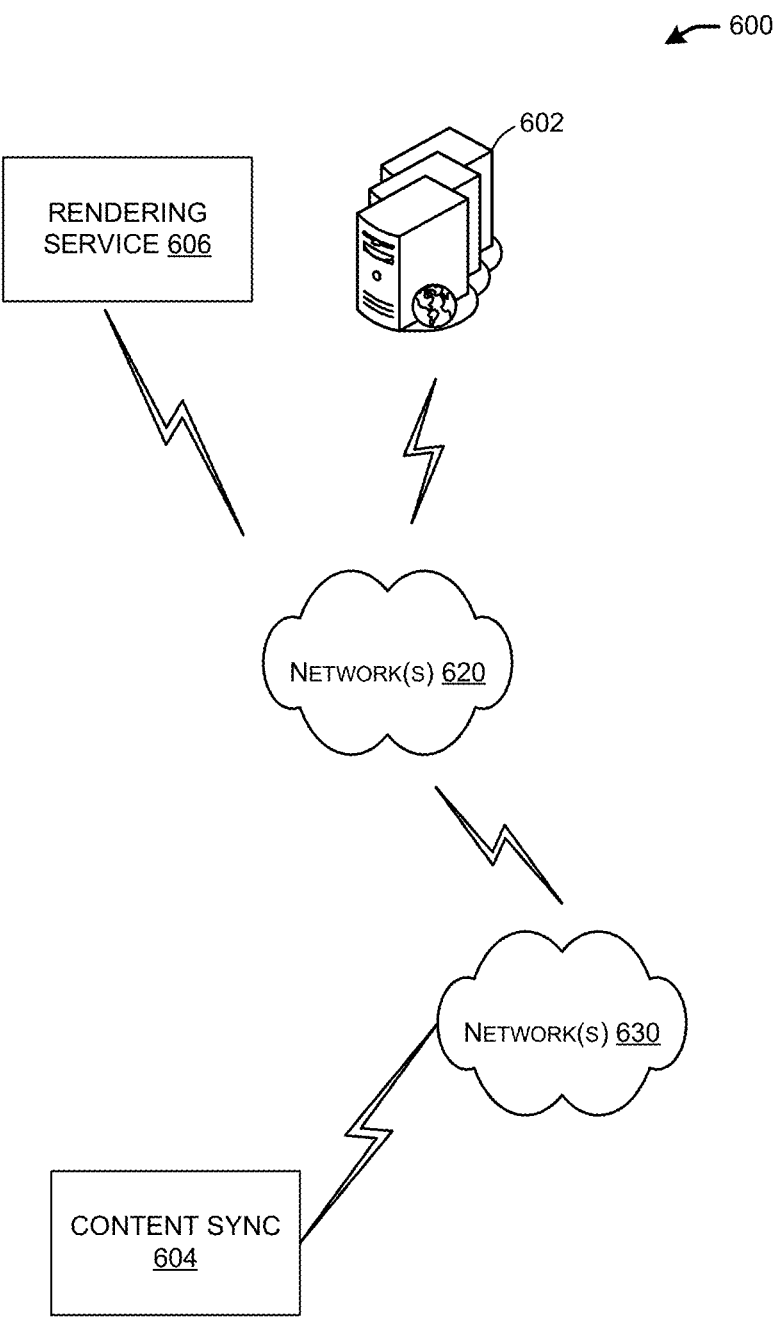
FIG. 6 illustrates an example system for immersive digital media, in accordance with one or more example embodiments of the present disclosure.

FIG. 6 illustrates an example system 600 for immersive digital media, in accordance with one or more example embodiments of the present disclosure.

Referring to FIG. 6, the system 600 may include one or more content servers 602 (e.g., content sources) delivering content to a content sync 604 over communications networks 620 and communications networks 630 (e.g., sharing properties with the one or more communications networks 420 of FIG. 4). A content rendering service 606 may be in communication with the one or more content servers 602 and the content sync 604, and may collect information and data from the one or more content servers 602 and the content sync 604 to create one or more displayable versions of content for the content sync 604 (e.g., based on the type/parameters of the display for the content sync 604, the user's vantage point, etc.). The one or more content servers 602 may be holographic (e.g., volumetric). The content sync 604 may produce video data that may be multi-dimensional in display. The rendering service 606 may take a "slice" of volumetric visual data at a given time (e.g., the volumetric time slice 200 of FIG. 2A) based on a point-of-view of a user (e.g., the field of view 106 of FIG. 1), and may produce presentable volumetric time slices (e.g., the volumetric time slice 151 of FIG. 1) using any predefined content assets.

Figure 7:
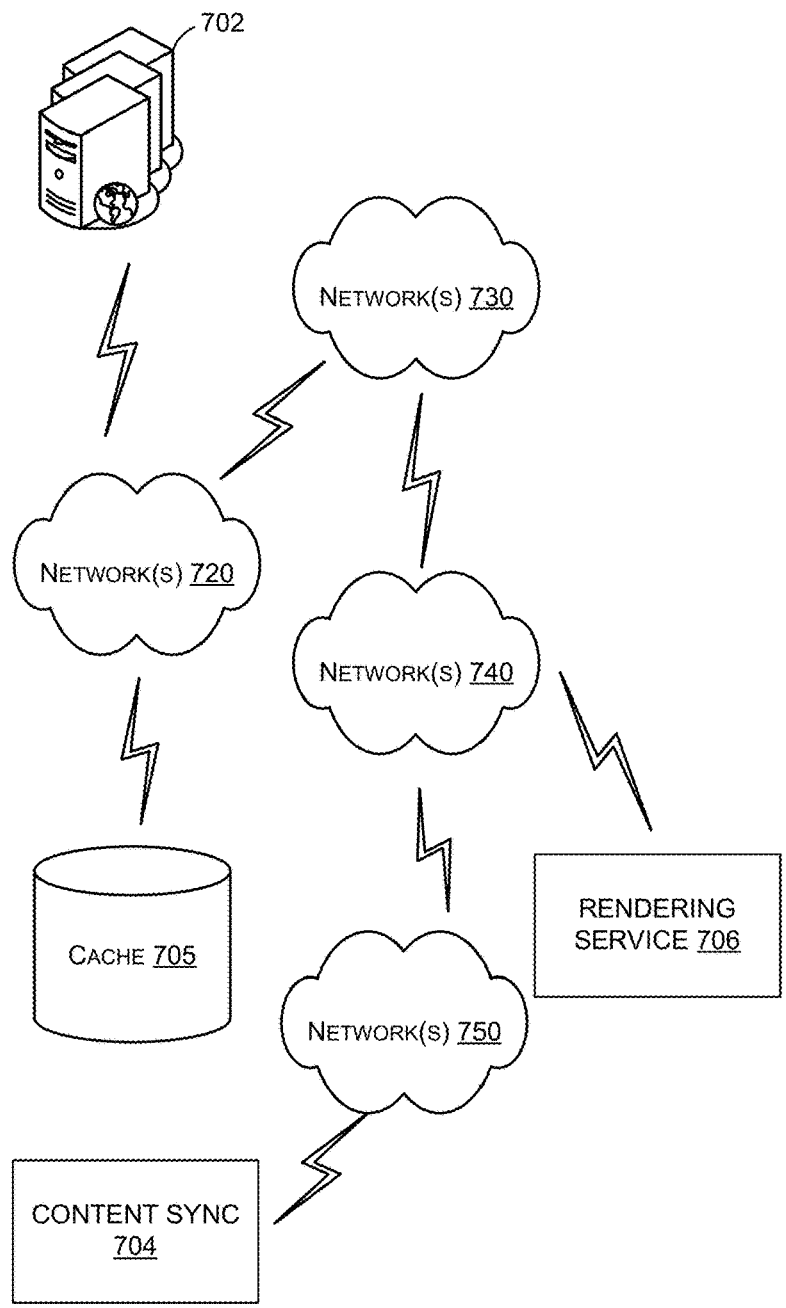
FIG. 7 illustrates an example system for immersive digital media, in accordance with one or more example embodiments of the present disclosure.

FIG. 7 illustrates an example system 700 for immersive digital media, in accordance with one or more example embodiments of the present disclosure.

Referring to FIG. 7, the system 700 may include one or more content servers 702 (e.g., content sources) delivering content to a content sync 704 over communications networks 720, communications networks 730, communications networks 740, and communications networks 750 (e.g., sharing properties with the one or more communications networks 420 of FIG. 4). A content rendering service 706 may be in communication with the one or more content servers 702 and the content sync 704, and may collect information and data from the one or more content servers 702 and the content sync 704 to create one or more displayable versions of content for the content sync 704 (e.g., based on the type/parameters of the display for the content sync 704, the user's vantage point, etc.). The system 700 may include a cache 705 to store content more proximal to the content sync 704 than the one or more content servers 702 may be located.

Figure 8:
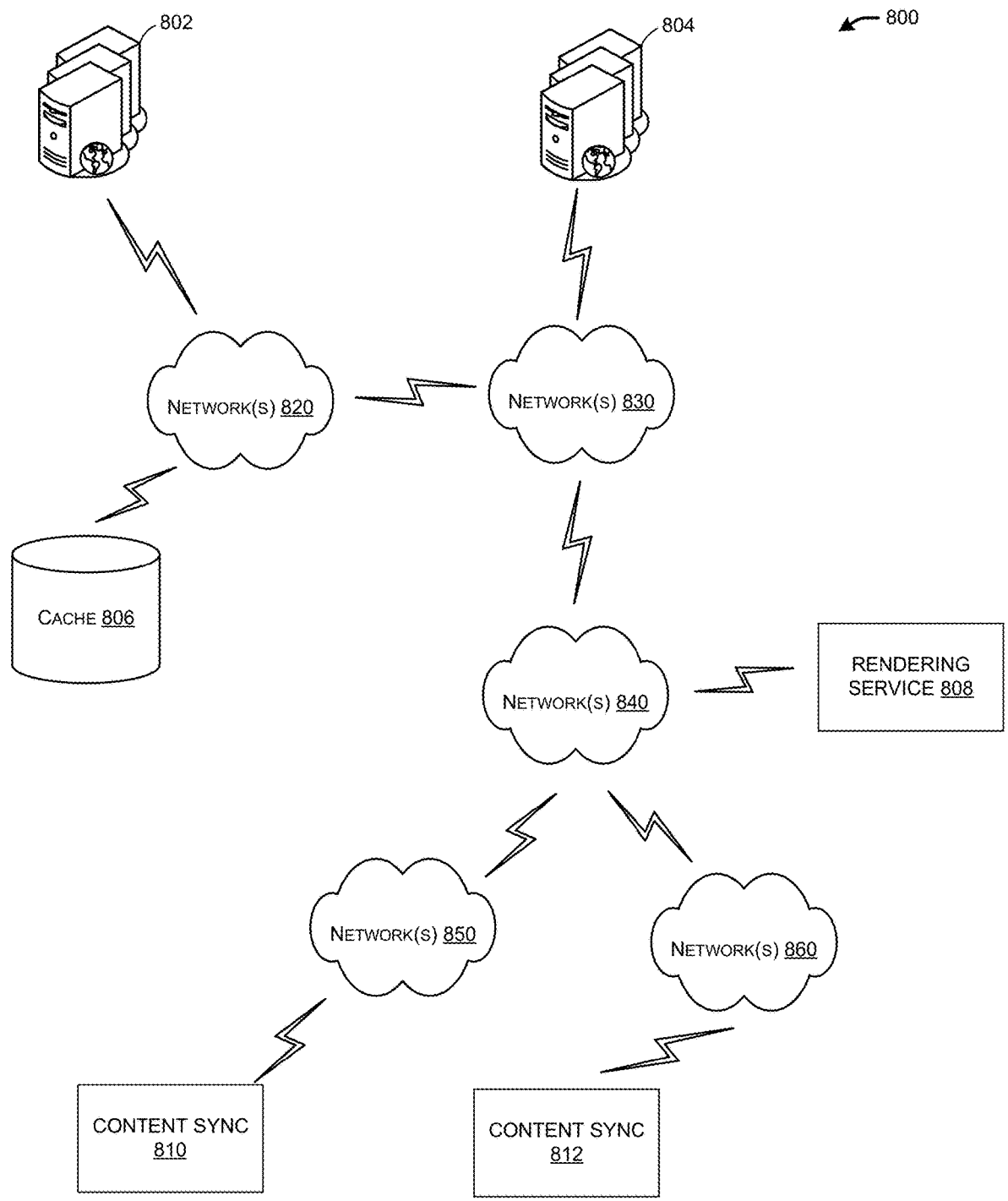
FIG. 8 illustrates an example system for immersive digital media, in accordance with one or more example embodiments of the present disclosure.

FIG. 8 illustrates an example system 800 for immersive digital media, in accordance with one or more example embodiments of the present disclosure.

Referring to FIG. 8, the system 800 may include one or more content servers 802 and one or more content servers 804 (e.g., content sources) delivering content to content sync 810 and content sync 810 over communications networks 820, communications networks 830, communications networks 840, communications networks 850, and communications networks 860 (e.g., sharing properties with the one or more communications networks 420 of FIG. 4). A content rendering service 808 may be in communication with the one or more content servers 802, the one or more content servers 804, the content sync 810, and the content sync 812, and may collect information and data from the one or more content servers 802, the one or more content servers 804, the content sync 810, and the content sync 812 to create one or more displayable versions of content for the content sync 810 and/or the content sync 812 (e.g., based on the type/ parameters of the display for the content sync 810 and/or the content sync 812, a user's vantage point, etc.). The system 800 may include a cache 806 to store content more proximal to the content sync 810 and/or the content sync 812 than the one or more content servers 802 or the one or more content servers 804 may be located.

Figure 9:
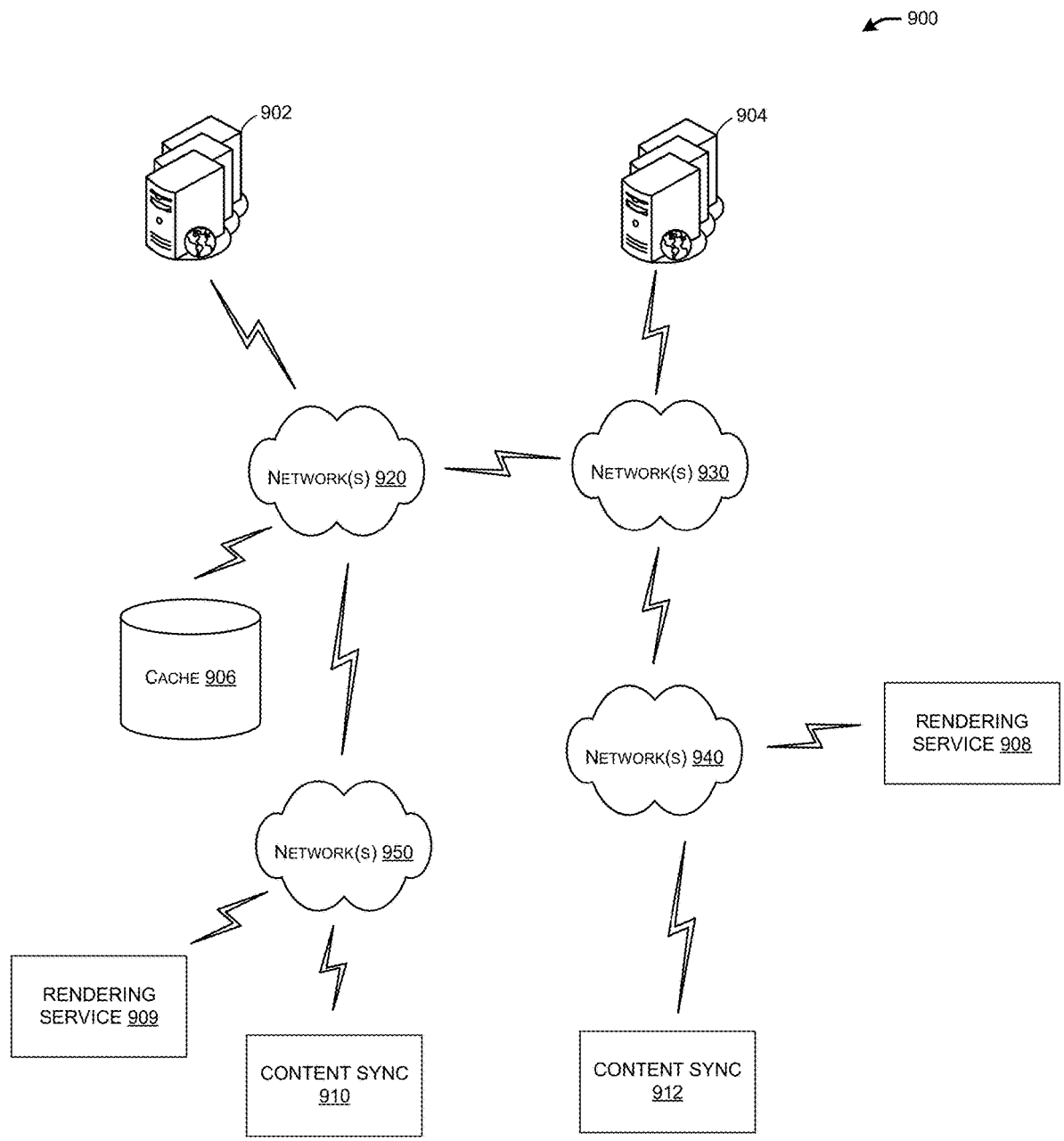
FIG. 9 illustrates an example system for immersive digital media, in accordance with one or more example embodiments of the present disclosure.

FIG. 9 illustrates an example system 900 for immersive digital media, in accordance with one or more example embodiments of the present disclosure.

Referring to FIG. 9, the system 900 may include one or more content servers 902 and one or more content servers 904 (e.g., content sources) delivering content to content sync 910 and content sync 910 over communications networks 920, communications networks 930, communications networks 940, and communications networks 950 (e.g., sharing properties with the one or more communications networks 420 of FIG. 4). A content rendering service 908 and content rendering service 909 (e.g., cloud-based content rendering points) may be in communication with the one or more content servers 902, the one or more content servers 904, the content sync 910, and the content sync 912, and may collect information and data from the one or more content servers 902, the one or more content servers 904, the content sync 910, and the content sync 912 to create one or more displayable versions of content for the content sync 910 and/or the content sync 912 (e.g., based on the type/parameters of the display for the content sync 910 and/or the content sync 912, a user's vantage point, etc.). The system 900 may include a cache 906 to store content more proximal to the content sync 910 and/or the content sync 912 than the one or more content servers 902 or the one or more content servers 904 may be located.

In one or more embodiments, the cache 906 may store and provide user-generated source content (e.g., provided by the content sync 910).

In one or more embodiments, the rendering service 908 and the rendering service 909 may be arranged for optimal delivery and rendering of content to the content sync 910 and the content sync 912. For example, given network conditions, latency, device types, content types, user preferences, and the like, a device (e.g., a cloud computing resource manager) may determine the cloud-based locations of the rendering services.

In one or more embodiments, a plurality of available cloud computing servers may be identified by a cloud computing resource manager ("CCRM"). The CCRM may include one or more computers. The initiation of one or more processes on one or more servers included in the plurality of cloud computing servers may be directed by the CCRM. Operational data associated with the operation of the one or more processes and network data associated with network timing delays between the one or more servers and one or more client devices in communication with the one or more servers may be obtained by the CCRM. Based at least in part upon the operational data and the network data, the distribution of resources among the plurality of cloud computing servers may be managed by the CCRM. The CCRM may obtain operational data associated with the operation of one or more cloud processes and network data associated with timing delays between the cloud servers and any number of client devices in communication with the cloud servers. The CCRM may then utilize the operational data and network data to manage the distribution of resources. In this regard, resources may be distributed in order to facilitate timing requirements of a large-loop system. For example, timing requirements associated with a content distribution network may be taken into consideration when distributing cloud resources.

In one or more embodiments, a content consumption device (e.g., a sync) and content consumption hub device may form part of a same content information network. The content consumption hub device may support functionality for coordinating the receipt of content consumption event information from content consumption devices within its own content information network (and potentially content consumption event information pertaining to content consumption events associated with content consumption devices forming part of one or more other content information networks) as well as the dissemination of the content consumption event information among content consumption devices within its own content information network. A content consumption hub device may also be a content consumption device having content consumption events associated therewith. The content consumption hub device may further support functionality for communicating a request to one or more content information hubs for content-related information associated with content identified in received content consumption event information. Upon receipt of the content-related information from the content information hub(s), the content consumption hub device may communicate the information to one or more content consumption devices forming part of a same content information network. Upon receiving the content-related information, any particular content consumption device may present at least a portion of the information to a user of the device based on user setting(s) and/or device setting(s).

In one or more embodiments, the systems of FIGS. 1-9 may be implemented in various use cases. For example, an immersive digital media system may create or revisit memories of a user experience (e.g., virtual representations of physical environments), such as a user moving around a theme park or other environment. A user may wear a rig or other device to capture light from the surrounding environment. A remote viewer (e.g., not within the physical environment to be represented virtually) may wear a virtual or augmented reality device to simulate the experience of the user wearing the rig that is recording live events. In this manner, a person may simulate being with another person in another location. In gaming use cases, single player and multi-player modes may be implemented. For example, one or multiple users may interact with one another by simulating/recreating another user's environment. A single player environment may allow a user to simulate/recreate a scene or other environment using light signals. Gaming providers may generate layers, scenes, and other visual representations of environments to render for game players, including add-on features. In movie or other video use cases, both passive and active viewership cases may be implemented. In a passive viewership role, a user's point-of-view or visual focus may be defined by a content provider. Using sync characteristics, such as a user's height or position, the content rendering may be customized to simulate different vantage points, movements, etc. In MMRPG cases (e.g., enhanced gaming), users may create mods, sell content, customize content, and the like (e.g., a hybrid sync plus source model).

It is understood that the above descriptions are for purposes of illustration and are not meant to be limiting.

Figure 10:
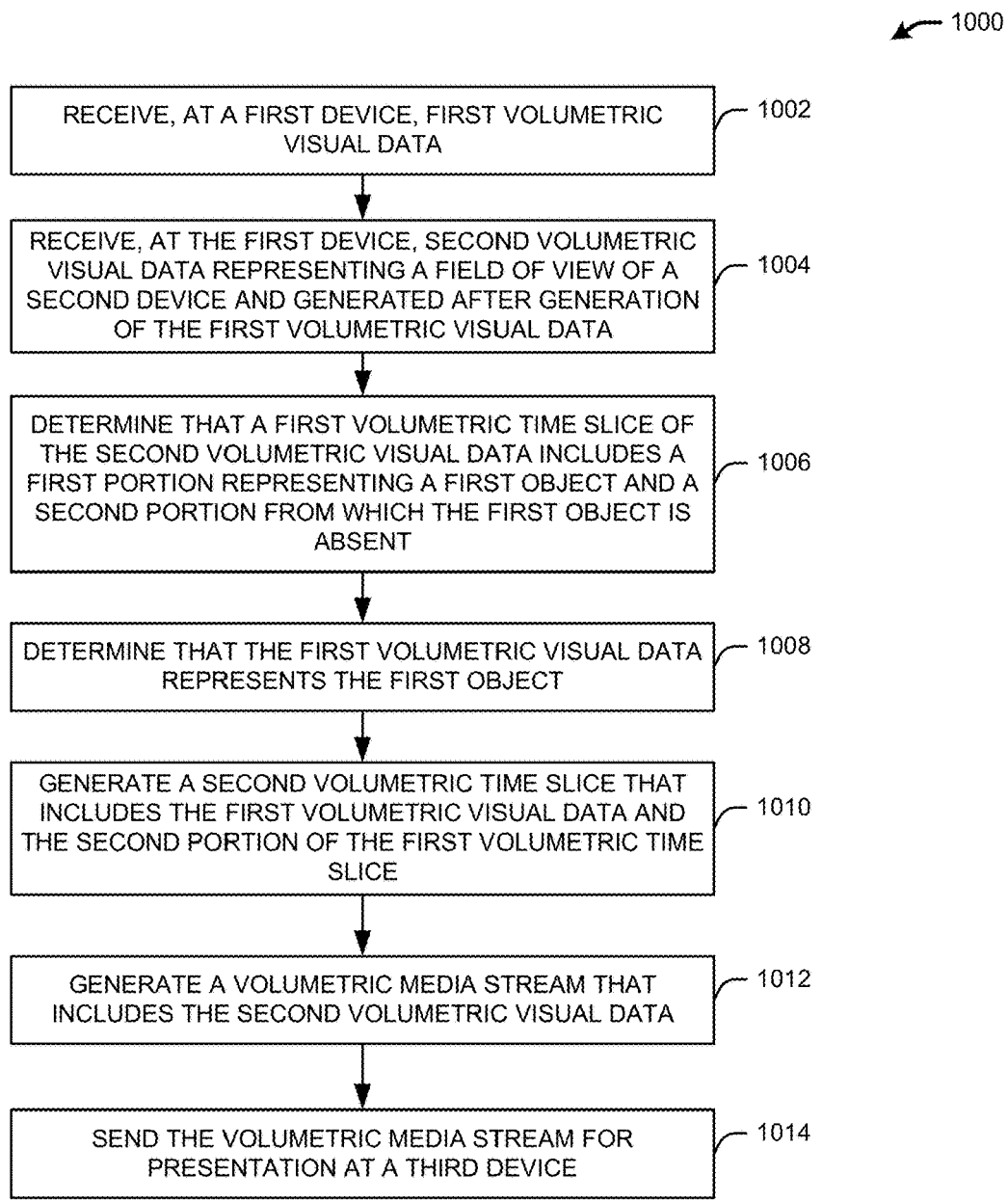
FIG. 10 illustrates a flow diagram of illustrative process for immersive digital media, in accordance with one or more example embodiments of the present disclosure.

FIG. 10 illustrates a flow diagram of illustrative process 1000 for immersive digital media, in accordance with one or more example embodiments of the present disclosure.

At block 1002, a device (or system, e.g., the level_1a rendering 316 of FIG. 3, the level-A1a1-1 rendering 306 of FIG. 3, the level_1a1-2 rendering 308 of FIG. 3, the content sync 404 of FIG. 4, content sync 504 of FIG. 5, rendering service 606 of FIG. 6, the content sync 604 of FIG. 6, the content sync 704 of FIG. 7, the rendering service 706 of FIG. 7, the rendering service 808 of FIG. 8, the content sync 810 of FIG. 8, the content sync 812 of FIG. 8, rendering service 908 of FIG. 9, the rendering service 909 of FIG. 9, the content sync 910 of FIG. 9, the content sync 912 of FIG. 9) may receive first volumetric visual data. The first volumetric visual data may include pre-generated and pre-defined content assets (e.g., the volumetric visual representation 154, the volumetric visual representation 156, the volumetric visual representation 160 of FIG. 1), which may be stored at the device or received from a content source (e.g., a CDN, and cache serving as a proxy device, etc.). Because the pre-generated and pre-defined content assets may represent volumetric visual and/or audio data at respective times, the pre-generated and pre-defined content assets may be considered volumetric time slices.

At block 1004, the device may receive second volumetric visual data (e.g., the volumetric time slice 200 of FIG. 2A) generated by a second device (e.g., the headset 104 of FIG. 1) at a time after the generation of the pre-generated and pre-defined content assets, and based on a field of view (e.g., the field of view 106 of FIG. 1) of the second device. The second volumetric data may include volumetric time slices of a first volumetric media feed (e.g., streaming volumetric visual data of a VR/AR environment) representing visual and/or audio data detected by the second device.

At block 1006, the device may determine that a first volumetric time slice of the second volumetric visual data includes a portion (e.g., the portion 210, the portion 220, the portion 230 of FIG. 2A) representing an object (e.g., the structure 108, the tree 118, the person 114 of FIG. 1), and a second portion (e.g., any portions of the volumetric time slice 200 of FIG. 2A that exclude the portion 210, the portion 220, and/or the portion 230) in which the object is not present (e.g., representing another object, the sky, the ground, etc.). The device may determine the presence of the object in the volumetric time slice based on any combination of image analysis techniques, timing information associated with when the second volumetric visual data is generated, location information associated with where the second volumetric visual data is generated, voice utterances detected by the second device (e.g., keywords identified in audio data representing one or more people mentioning the object in the presence of the second device, the keywords matching data indicating the object represented by the first volumetric data, such as with a tag), gestures detected by the second device, or other contextual data that may be used to identify objects represented by the second volumetric visual data. The device may determine whether any object represented by the second volumetric visual data matches or is otherwise represented by the first volumetric visual data.

At block 1008, the device may determine that the first volumetric visual data represents the object identified as represented by the second volumetric visual data. For example, the device may determine whether any pre-defined content asset is detected as represented by the second volumetric visual data. Pre-defined content assets represented by the first volumetric visual data may be identified using tags, metadata, location data, or other data. For example, when the portion 210 of the volumetric time slice 200 represents a known structure (e.g., the structure 108), the device may identify one or more pre-defined content assets that represent presentable volumetric visual data showing the structure 108 (e.g., pre-generated images of the structure 108) based on a similarity between the first volumetric visual data and the first portion of the second volumetric visual data, the location of the second device in comparison with a known location of the structure represented by the first volumetric visual data, or the like. The first volumetric visual data may not be the exact same as the first portion of the second volumetric visual data. For example, the object represented by the first volumetric visual data may be encoded with a different resolution than the object represented by the first portion of the volumetric time slice, and/or may represent a different view of the object (e.g., not from the exact same viewing angle/vantage point of the second device, but close enough to represent a view of the second device or someone who hypothetically may be nearby the second device when the second volumetric visual data is generated). When the device determines that the second volumetric visual data represents an object that either has no matching object represented by the first volumetric visual data, or has a matching object represented by the first volumetric visual data, but that may not be used based on a user preference and/or network condition, the device may not substitute the portion of the volumetric time slice that represents that object with the first volumetric visual data.

At block 1010, the device may generate a second volumetric time slice (e.g., the volumetric time slice 151 of FIG. 1) that stitches together or otherwise combines the second portion of the volumetric time slice with the first volumetric visual data. For example, as shown in FIG. 2B, the portion 210 of the volumetric time slice 200 may be "filled in" with volumetric visual representation 154 to generate the volumetric time slice 151. In this manner, the volumetric time slice 151 may present the structure 108 at a different resolution and/or viewing angle/vantage point than the second device may detect the structure 108. Similarly, the tree 118 in the field of view 106 of the second device may be replaced with a different tree (e.g., the volumetric time slice 156) that may be the same tree at a different resolution, or may be a pre-stored image of a completely different tree (e.g., because the device may determine that the first volumetric visual data representing the object is not tagged or otherwise indicated as an object of interest). When the device generates the second volumetric media stream, the device may evaluate telemetry data or other contextual data to determine adjustments to the second volumetric visual data to be made when generating the second volumetric time slice. For example, the telemetry data may result in the identification of the pre-defined content asset to select to use in the second volumetric time slice based on a different point of view than the one used by the second device to detect the second volumetric visual data. User data may indicate that certain objects may be presented in a particular manner. Because the pre-generated and pre-defined content assets may be considered volumetric time slices, the second volumetric time slice may represent a combination of portions of multiple volumetric time slices.

At block 1012, the device may generate a second volumetric media stream (e.g., a modified version of the volumetric media stream represented by the second volumetric visual data) that includes the second volumetric time slice generated at block 1010. To generate the second volumetric media stream, the device may encode any volumetric time slice of the second volumetric media stream based on whether any pre-defined content assets were used, whether the pre-defined content assets represented objects of interest, network conditions, user preferences, and the like. The second volumetric media stream also may include supplemental information to display with the second volumetric time slice, such as information about nearby people (e.g., as identified using the second volumetric visual data and/or any user inputs), information about structures, products (e.g., merchandise identified in the second volumetric visual data and/or by a user input), and the like. For example, when a user of the second device points to a shirt that another person is wearing, the second volumetric media stream may include media data identifying purchase information associated with the shirt (e.g., when the shirt is an object recognized by the device and is stored with the purchase information). In this manner, the person who views the second volumetric media stream may have the option to initiate a purchase of the merchandise.

At block 1014, the device may send the second volumetric media stream for presentation at a third device (e.g., the headset 152 of FIG. 1). The device may send the device to a content sync before the second device receives the second volumetric media stream. The device and/or the content sync may be more proximal to the third device than to the second device. When the first volumetric visual data is stored on another device (e.g., a cache), the other device may be more proximal to the device than to the second device to provide a proxy for the device.

It is understood that the above descriptions are for purposes of illustration and are not meant to be limiting.

Figure 11:
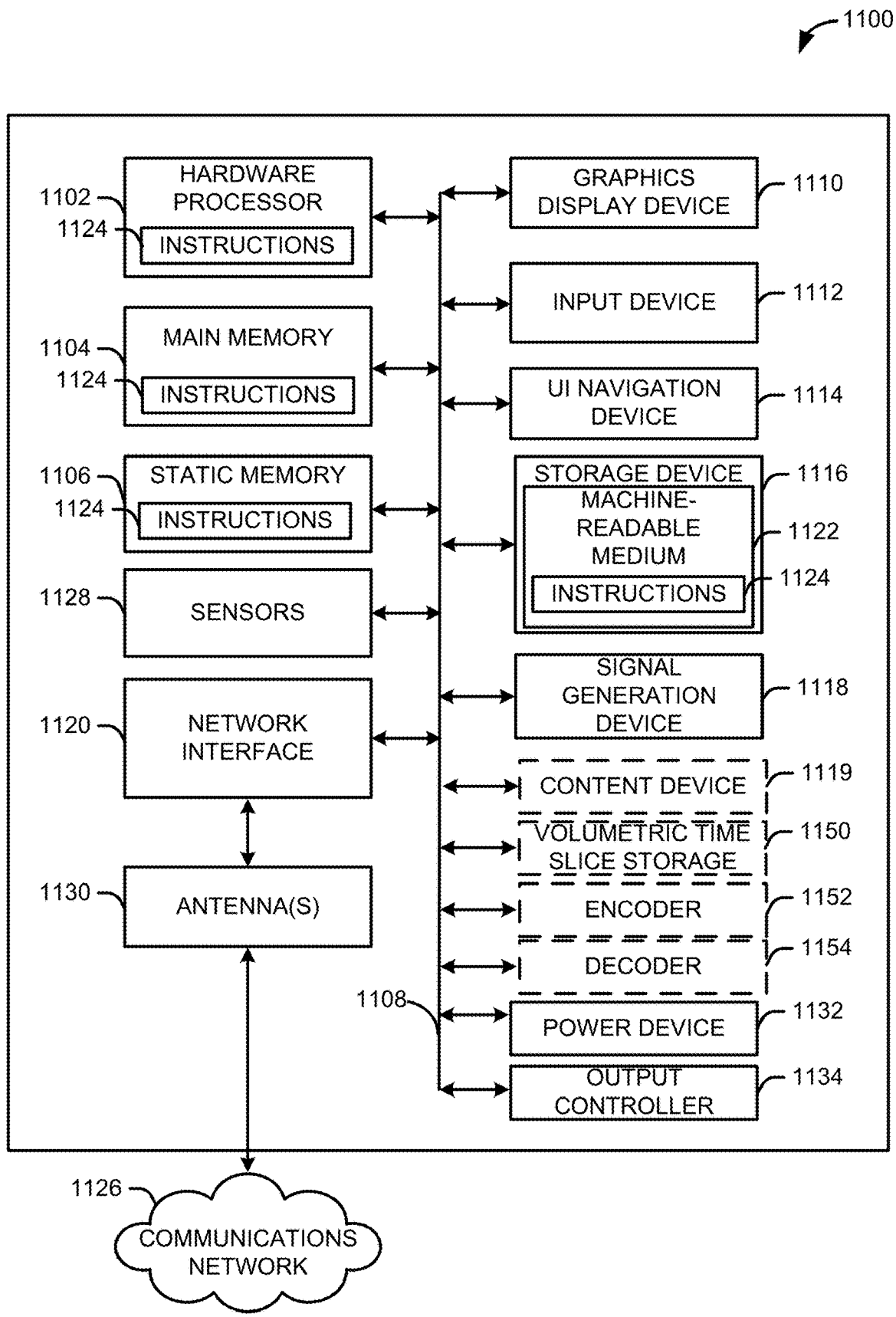
FIG. 11 illustrates a block diagram of an example machine upon which any of one or more techniques (e.g., methods) may be performed, in accordance with one or more example embodiments of the present disclosure.

FIG. 11 illustrates a block diagram of an example of a machine 1100 (e.g., implemented in whole or in part by any of the devices shown in FIGS. 1-9) or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. The machine 1100 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include any combination of the illustrated components. For example, the machine 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a signal generation device 1118 (e.g., a data signal), an optional content device 1119 (e.g., capable of performing the operations of the process 1000 of FIG. 10), a network interface device/transceiver 1120 coupled to antenna(s) 1130, and one or more sensors 1128, such as a sound detecting sensor (e.g., a microphone, light detection sensor, LiDAR sensor, etc.), accelerometers, magnetometers, location sensors, and the like. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)), an optional volumetric time slice storage 1150 (e.g., to store volumetric time slices such as the volumetric time slice 200 of FIG. 2A and the volumetric time slice 151 of FIG. 1), an optional encoder 1152 for encoding media data, and/or an optional decoder 1154 for decoding encoded media data.

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method of providing a volumetric media stream, the method comprising:
   receiving, by at least one processor of a first device, first volumetric visual data generated at a first time, comprising encoded candidate volumetric visual data with which to replace portions of volumetric media streams;
   receiving, by the at least one processor, a first volumetric media stream from a second device, the first volumetric media stream comprising second volumetric visual data comprising a first volumetric time slice representing a field of view of a second device, the second volumetric visual data generated at a second time after the first time;

detecting, by the at least one processor, a first object represented by a first portion of the first volumetric time slice, and wherein the first portion represents a subset of the first volumetric time slice;

determining, by the at least one processor, that the encoded candidate volumetric visual data comprise an encoded representation of the first object, wherein the first volumetric visual data are smaller than the first volumetric time slice;

generating, by the at least one processor, based on the first volumetric visual data and the first portion of the first volumetric time slice representing the first object, a second volumetric time slice comprising the first volumetric visual data and a second portion of the first volumetric time slice, wherein generating the second volumetric time slice comprises removing the first portion from the first volumetric time slice and inserting the first volumetric visual data into the first volumetric time slice;

generating, by the at least one processor, a second volumetric media stream, the second volumetric media stream comprising the second volumetric time slice; and sending, by the at least one processor, the second volumetric media stream for presentation at a third device.

2. The method of claim 1, wherein the first volumetric visual data are different than the first portion of the second volumetric visual data.

3. The method of claim 1, further comprising:
identifying telemetry data associated with the field of view and the second volumetric visual data; and
determining, based on the telemetry data, a second field of view associated with the second device and the second volumetric visual data, the field of view different than the second field of view,
wherein the first volumetric visual data represent the first object using the second field of view.

4. The method of claim 1, further comprising:
stitching the first volumetric visual data and the second portion of the first volumetric time slice, wherein the inserting comprises the stitching; and
encoding the first volumetric visual data and the second portion of the first volumetric time slice,
wherein generating the second volumetric time slice is based on the stitching and the encoding.

5. The method of claim 1, wherein determining that the first encoded candidate volumetric visual data comprise the encoded representation of the first object is based on one or more image analysis techniques, and wherein determining generating the second volumetric time slice is based on the determination that the encoded candidate volumetric visual data comprise the encoded representation of the first object.

6. The method of claim 1, further comprising:
determining a location associated with the second device and the second time,
wherein detecting the first object is based on determining the location,
wherein determining that the encoded candidate volumetric visual data comprise the encoded representation of the first object is based on the location of the second device.

7. The method of claim 1, further comprising determining that the first object is to be presented at the second time,
wherein determining that the encoded candidate volumetric visual data comprise the encoded representation of the first object is based on the determination that the first object is to be presented at the second time.

8. The method of claim 1, further comprising:
receiving audio data associated with the second device;
identifying one or more keywords included in the audio data; and
determining, based on the one or more keywords, that the audio data are associated with the first object,
wherein determining that the encoded candidate volumetric visual data comprise the encoded representation of the first object is based on the determination that the audio data are associated with the first object.

9. The method of claim 1, wherein the first volumetric visual data comprise a representation of a person or a structure, further comprising determining that the person or the structure is associated with the first object.

10. The method of claim 1, further comprising:
determining that the first volumetric time slice comprises a third portion representing the second object different than the first object; and
determining that the second object is not represented by the first volumetric visual data or by third volumetric visual data generated before the second time,
wherein the second volumetric time slice further comprises the third portion.

11. The method of claim 1, further comprising:
determining that the first volumetric time slice comprises a third portion representing the second object;
determining third volumetric visual data generated before the second time; and
determining that the second object is represented by the third volumetric visual data,
wherein the second volumetric time slice further comprises the third volumetric visual data.

12. The method of claim 1, wherein the first device is a network device more proximal to the third device than to the second device, and wherein the first device does not capture volumetric visual data.

13. The method of claim 1, wherein generating the second volumetric media stream comprises generating an indication that the first object is available for purchase, the method further comprising:
identifying a user input associated with the second device, the user input indicative of a selection of the first object; and
determining purchase information associated with the first object,
wherein the second volumetric media stream comprises an indication of the purchase information for concurrent display with the second volumetric time slice.

14. A system comprising memory coupled to at least one processor, the at least one processor configured to:
receive first volumetric visual data generated at a first time and comprising encoded candidate volumetric visual data with which to replace portions of volumetric media streams;
receive a first volumetric media stream from a second device, the first volumetric media stream comprising second volumetric visual data comprising a first volumetric time slice representing a field of view of a first device, the second volumetric visual data generated at a second time after the first time;

detect a first object represented by a first portion of the first volumetric time slice, and wherein the first portion represents a subset of the first volumetric time slice;

determine that the encoded candidate volumetric visual data comprise an encoded representation of the first object, wherein the first volumetric visual data are smaller than the first volumetric time slice;

generate a second volumetric time slice comprising the first volumetric visual data and a second portion of the first volumetric time slice;

generate, based on the first volumetric visual data and the first portion of the first volumetric time slice representing the first object, a second volumetric media stream, the second volumetric media stream comprising the second volumetric time slice, wherein to generate the second volumetric time slice comprises to remove the first portion from the first volumetric time slice and insert the first volumetric visual data into the first volumetric time slice; and send the second volumetric media stream for presentation at a second device.

15. The system of claim 14, wherein the system is a network system that is more proximal to the second device than to the first device and that does not capture volumetric visual data.

16. The system of claim 14, wherein the at least one processor is further configured to:

identify telemetry data received from a third device, the telemetry data associated with the field of view and the second volumetric visual data; and determine, based on the telemetry data, a second field of view associated with the second device and the second volumetric visual data, the field of view different than the second field of view, wherein the first volumetric visual data represent the first object using the second field of view.

17. The system of claim 14, wherein the first volumetric visual data are received from a network device in a different geographic location than the system and the first device.

18. A device comprising memory coupled to at least one processor, the at least one processor configured to:

receive first volumetric visual data generated at a first time and comprising encoded candidate volumetric visual data with which to replace portions of volumetric media streams;

receive a first volumetric media stream from a second device, the first volumetric media stream comprising second volumetric visual data comprising a first volumetric time slice representing a field of view of a second device, the second volumetric visual data generated at a second time after the first time;

detect that a first object represented by a first portion of the first volumetric time slice, and wherein the first portion represents a subset of the first volumetric time slice;

determine that the encoded candidate volumetric visual data comprise an encoded representation of the first object, wherein the first volumetric visual data are smaller than the first volumetric time slice;

generate, based on the first volumetric visual data and the first portion of the first volumetric time slice representing the first object, a second volumetric time slice comprising the first volumetric visual data and a second portion of the first volumetric time slice, wherein to generate the second volumetric time slice comprises to remove the first portion from the first volumetric time slice and insert the first volumetric visual data into the first volumetric time slice;

generate a second volumetric media stream, the second volumetric media stream comprising the second volumetric time slice; and send the second volumetric media stream for presentation at a third device.

19. The device of claim 18, wherein the at least one processor is further configured to:

determine a location associated with the second device and the second time, wherein to detect the first object is based on determining the location, wherein to determine that the encoded candidate volumetric visual data comprise the encoded representation of the first object is based on the location of the second device.

20. The device of claim 18, wherein the at least one processor is further configured to determine that the first object is to be presented at the second time, wherein to determine that the encoded candidate volumetric visual data comprise the encoded representation of the first object is based on the determination that the first object is to be presented at the second time.

* * * * *